United States Patent
Katayose

(10) Patent No.: US 12,399,345 B2
(45) Date of Patent: Aug. 26, 2025

(54) ZOOM LENS, EXTENDER, AND IMAGE PICKUP APPARATUS

(71) Applicant: CANON KABUSHIKI KAISHA, Tokyo (JP)

(72) Inventor: Masato Katayose, Tochigi (JP)

(73) Assignee: CANON KABUSHIKI KAISHA, Tokyo (JP)

(*) Notice: Subject to any disclaimer, the term of this patent is extended or adjusted under 35 U.S.C. 154(b) by 534 days.

(21) Appl. No.: 17/866,882

(22) Filed: Jul. 18, 2022

(65) Prior Publication Data

US 2023/0030784 A1 Feb. 2, 2023

(30) Foreign Application Priority Data

Jul. 27, 2021 (JP) ................. 2021-122560

(51) Int. Cl.
G02B 7/10 (2021.01)
G03B 3/10 (2021.01)

(52) U.S. Cl.
CPC ............ *G02B 7/102* (2013.01); *G03B 3/10* (2013.01)

(58) Field of Classification Search
CPC .... G02B 15/143105; G02B 15/144101; G02B 15/144105; G02B 15/144109; G02B 15/144113; G02B 15/145101; G02B 15/145105; G02B 15/145109; G02B 15/145113; G02B 15/145117; G02B 15/145121; G02B 15/145125; G02B 15/145129; G02B 15/1461; G02B 15/02; G02B 15/10; G02B 15/12

USPC ....... 359/690, 687, 688, 684, 676, 675, 674, 359/672

See application file for complete search history.

(56) References Cited

U.S. PATENT DOCUMENTS

| | | | | |
|---|---|---|---|---|
| 4,492,437 A | * | 1/1985 | Masumoto | G02B 15/1431 |
| | | | | 359/688 |
| 10,838,201 B2 | | 11/2020 | Katayose | |
| 10,921,569 B2 | | 2/2021 | Katayose | |
| 11,002,944 B2 | | 5/2021 | Katayose | |

(Continued)

FOREIGN PATENT DOCUMENTS

| | | |
|---|---|---|
| JP | 2009-069671 A | 4/2009 |
| JP | 2010-186179 A | 8/2010 |

(Continued)

OTHER PUBLICATIONS

Notice of Reasons for Refusal issued by the Japanese Patent Office on May 27, 2025 in corresponding JP Patent Application No. 2021-122560, with English translation.

*Primary Examiner* — Bumsuk Won
*Assistant Examiner* — Seth D Moser
(74) *Attorney, Agent, or Firm* — Carter, DeLuca & Farrell LLP

(57) ABSTRACT

A zoom lens consists of, in order from an object side to an image side, a first lens unit having a positive refractive power, a second lens unit having a negative refractive power, and a rear group including a plurality of lens units. A distance between adjacent lens units is changed during zooming. The rear group includes a diaphragm, an n-th lens unit disposed closest to an image plane and having a positive refractive power, and an (n−1)-th lens disposed on the object side of the n-th lens unit and having a negative refractive power. A predetermined condition is satisfied.

18 Claims, 13 Drawing Sheets

(56) References Cited

U.S. PATENT DOCUMENTS

| | | |
|---|---|---|
| 11,243,385 B2 | 2/2022 | Katayose et al. |
| 11,249,291 B2 | 2/2022 | Katayose |
| 2006/0279850 A1* | 12/2006 | Horiuchi ........ G02B 15/145121 359/676 |
| 2015/0378134 A1* | 12/2015 | Koga ................... G02B 5/1814 359/356 |
| 2018/0045931 A1* | 2/2018 | Miyazawa ............. G02B 15/24 |
| 2020/0018946 A1* | 1/2020 | Takemoto ............... G02B 15/14 |
| 2022/0291490 A1* | 9/2022 | Muratani ........... G02B 27/0012 |
| 2025/0067964 A1* | 2/2025 | Ono ....................... G02B 13/18 |

FOREIGN PATENT DOCUMENTS

| | | |
|---|---|---|
| JP | 2011-107188 A | 6/2011 |
| JP | 2013-117667 A | 6/2013 |
| JP | 2013-182259 A | 9/2013 |
| JP | 2013-238827 A | 11/2013 |
| JP | 2015-206890 A | 11/2015 |
| JP | 2016-071179 A | 5/2016 |
| JP | 2017-156428 A | 9/2017 |
| JP | 2018-025625 A | 2/2018 |
| JP | 2019-028212 A | 2/2019 |
| JP | 2019-028258 A | 2/2019 |

* cited by examiner

ZOOM LENS, EXTENDER, AND IMAGE PICKUP APPARATUS

BACKGROUND

Technical Field

The disclosure relates to a zoom lens, which is suitable for a digital video camera, a digital still camera, a broadcasting camera, a film-based camera, a surveillance camera, and the like.

Description of the Related Art

A zoom lens having a large aperture diameter, a long focal length, and a small F-number has conventionally been demanded.

Moreover, there is known a method of changing a focal length of an optical system by inserting an extender (magnification conversion unit) different from the main optical system. For example, a zoom lens has been proposed in which a focal length range is changed to a long focal length side without changing the overall lens length (which is a distance from a lens surface closest to an object to an image plane) by inserting the extender into an optical path (See Japanese Patent Laid-Open Nos. 2010-186179 and 2013-238827).

However, since a large air gap is necessary to insert the extender into the optical path, the main optical system and the extender will become large if the position where the extender is inserted is not proper. In order to maintain good optical performance before and after the extender is inserted, it is necessary to properly set refractive powers of lens units before and after the extender.

SUMMARY

The disclosure provides a zoom lens having a large aperture diameter and a long focal length, which can easily change a focal length range to a long focal length side by inserting an extender into a main optical system and can maintain good optical performance before and after the extender is inserted.

A zoom lens according to one aspect of the disclosure consists of, in order from an object side to an image side, a first lens unit having a positive refractive power, a second lens unit having a negative refractive power, and a rear group including a plurality of lens units. A distance between adjacent lens units is changed during zooming. The rear group includes an aperture stop, an n-th lens unit disposed closest to an image plane and having a positive refractive power, and an (n−1)-th lens unit disposed adjacent to the n-th lens unit on the object side and having a negative refractive power. The following inequalities are satisfied:

$$-0.7 < fn-1/fn < -0.1$$

$$0.3 < Lnm/Lsi < 0.7$$

where fn−1 is a focal length of the (n−1)-th lens unit, fn is a focal length of the n-th lens unit, Lnm is a first distance on an optical axis from a lens surface closest to the image plane of the (n−1)-th lens unit to a lens surface closest to an object of the n-th lens unit at a zoom position that minimizes the first distance in an entire zoom range, and Lsi is a distance on the optical axis from the aperture stop to the image plane at the zoom position.

An extender according to another aspect of the disclosure attachable to and detachable from the above zoom lens and configured to convert a magnification of the zoom lens. The extender consists of, in order from the object side to the image side, a positive lens, a first cemented lens having a negative refractive power and consisting of a negative lens, a positive lens, and a negative lens, and a second cemented lens having a negative refractive power and consisting of a negative lens, a positive lens, and a negative lens, and a third cemented lens having a positive refractive power and consisting of a positive lens and a negative lens.

An image pickup apparatus according to another aspect of the disclosure includes a zoom lens, and an image sensor configured to receive an image formed by the zoom lens.

Further features of the disclosure will become apparent from the following description of exemplary embodiments with reference to the attached drawings.

DESCRIPTION OF THE EMBODIMENTS

Figure 1:
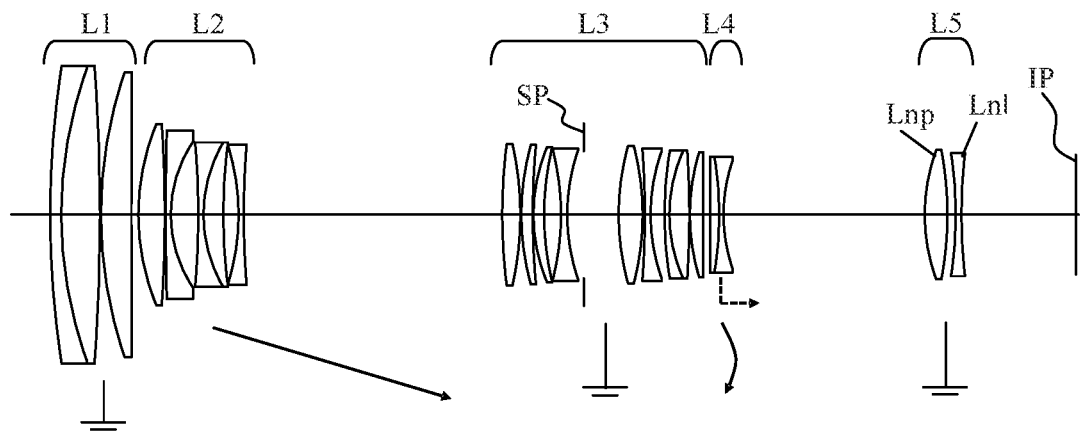
FIG. 1 is a sectional view of a zoom lens according to Example 1 at a wide-angle end.
Figure 2A:
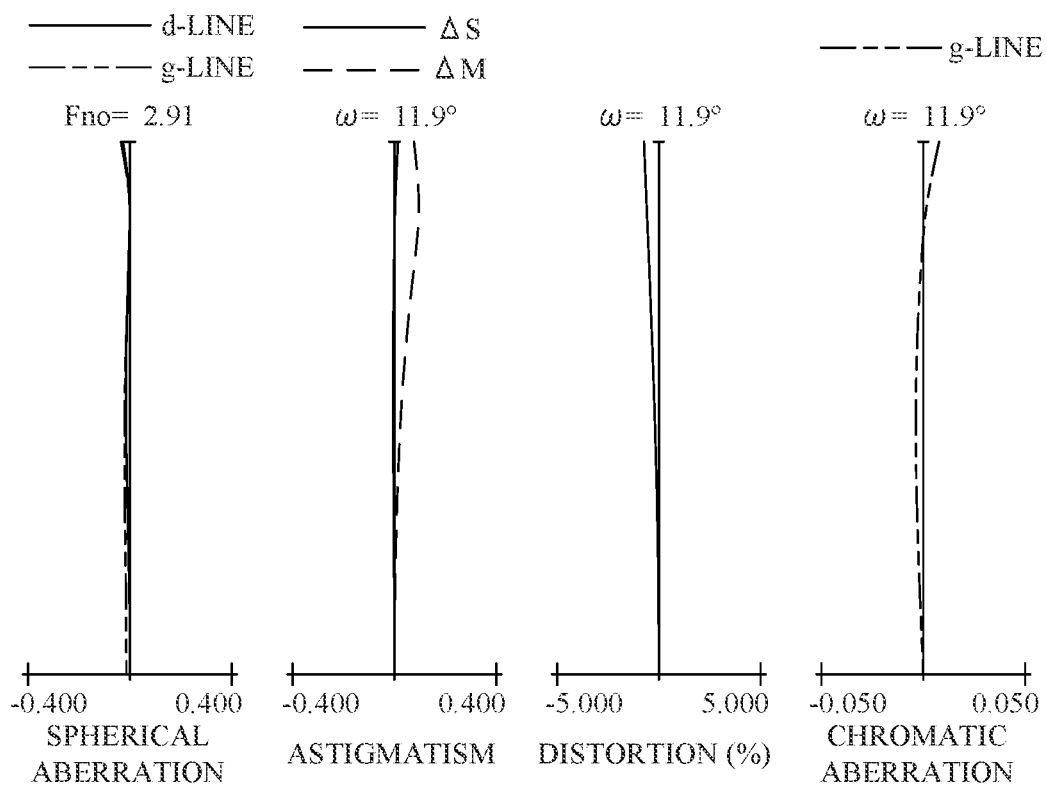
FIGS. 2A, 2B, and 2C are aberration diagrams at the wide-angle end (WIDE-ANGLE), an intermediate zoom position (MIDDLE), and a telephoto end (TELEPHOTO) of the zoom lens according to Example 1.
Figure 2B:
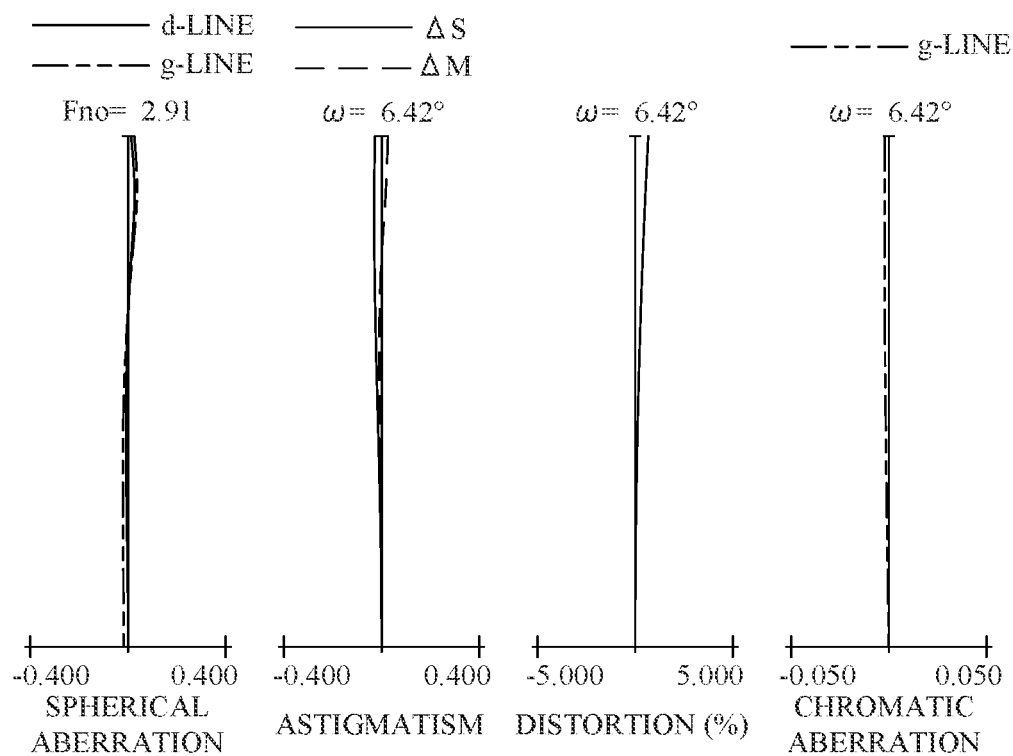
Figure 2C:
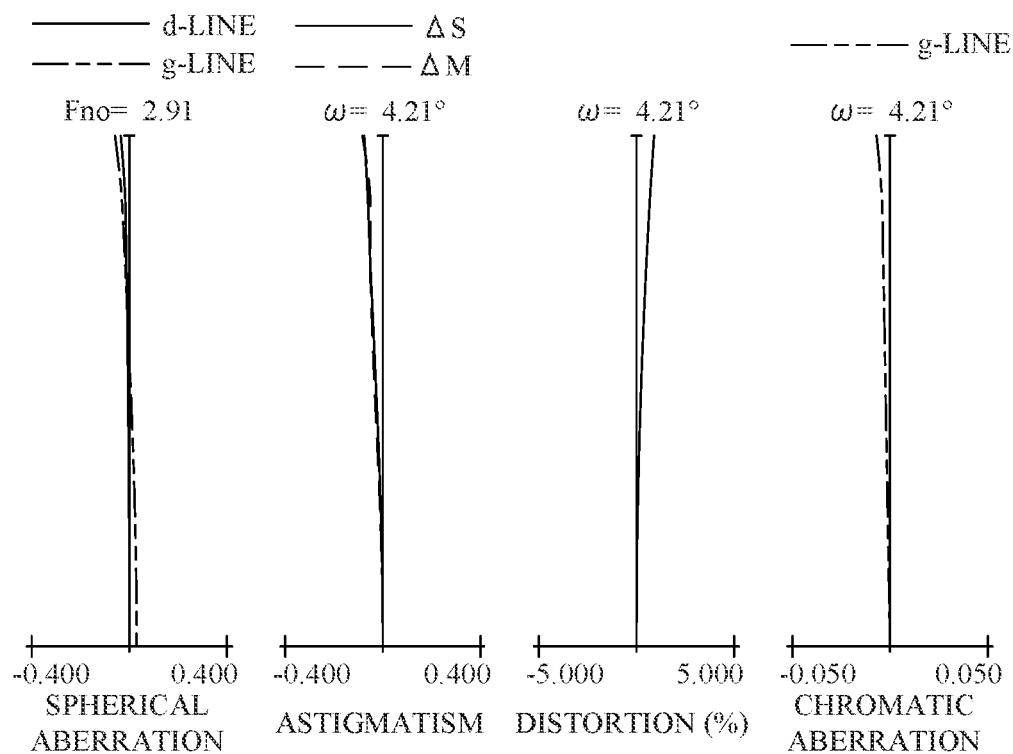
Figure 3:
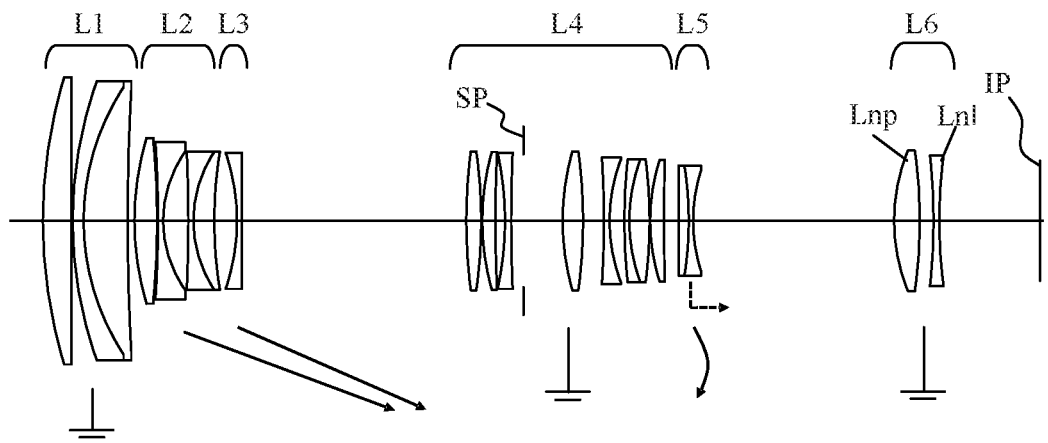
FIG. 3 is a sectional view of a zoom lens according to Example 2 at a wide-angle end.
Figure 4A:
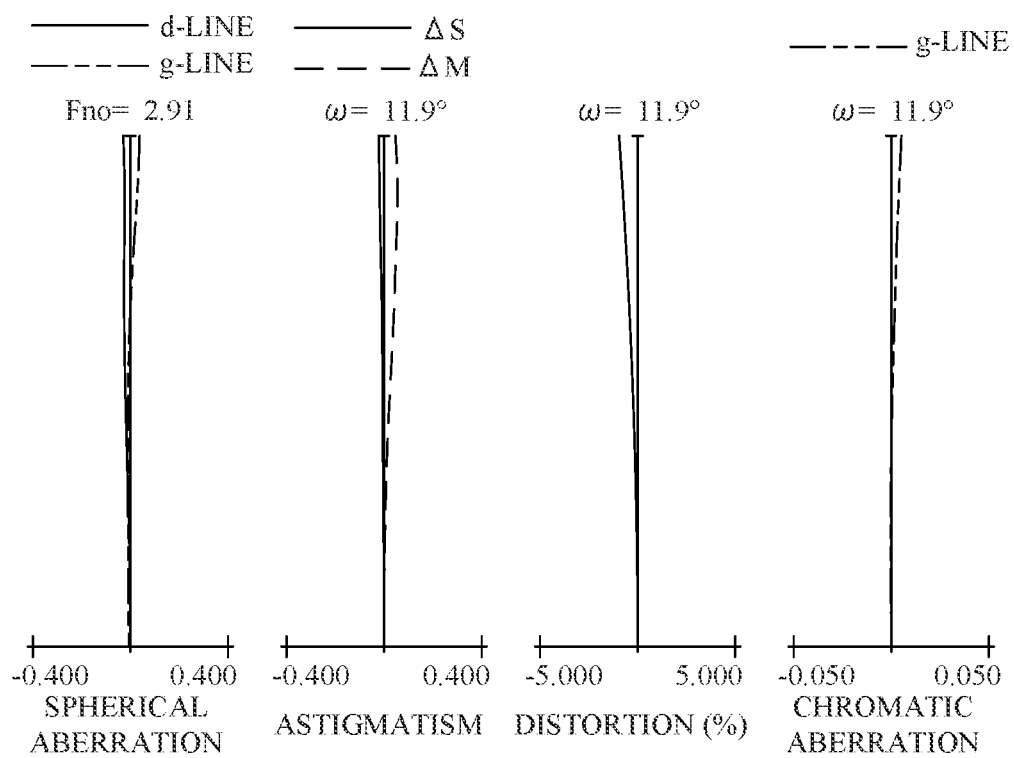
FIGS. 4A, 4B, and 4C are aberration diagrams at the wide-angle end, an intermediate zoom position, and a telephoto end of the zoom lens according to Example 2.
Figure 4B:
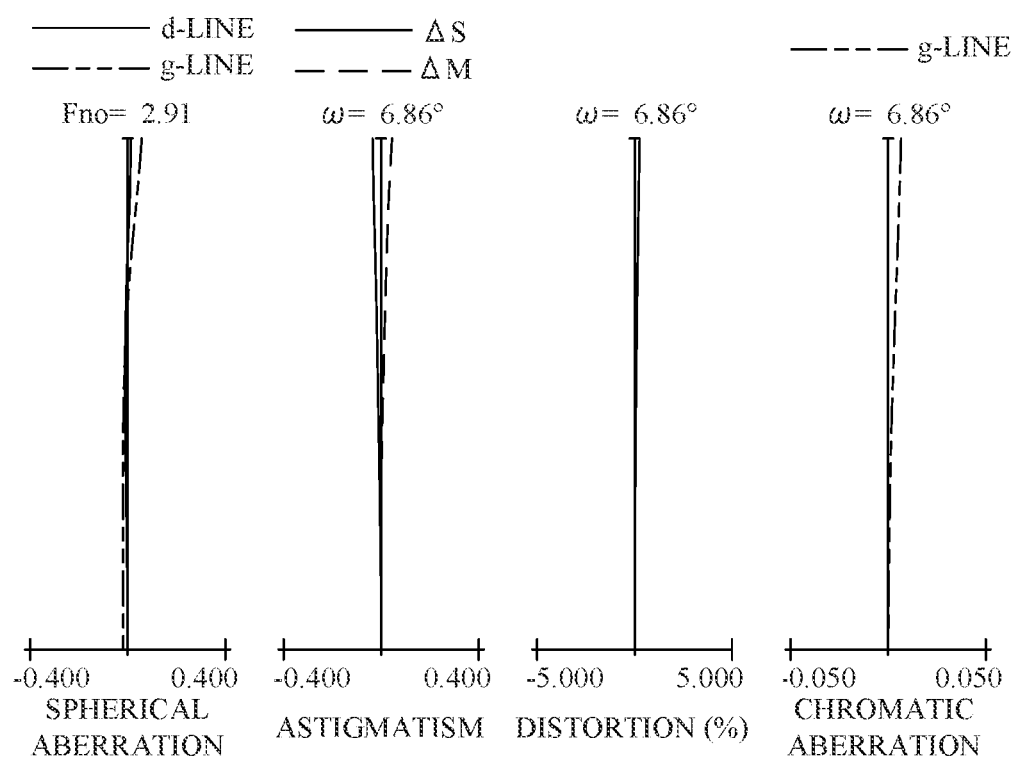
Figure 4C:
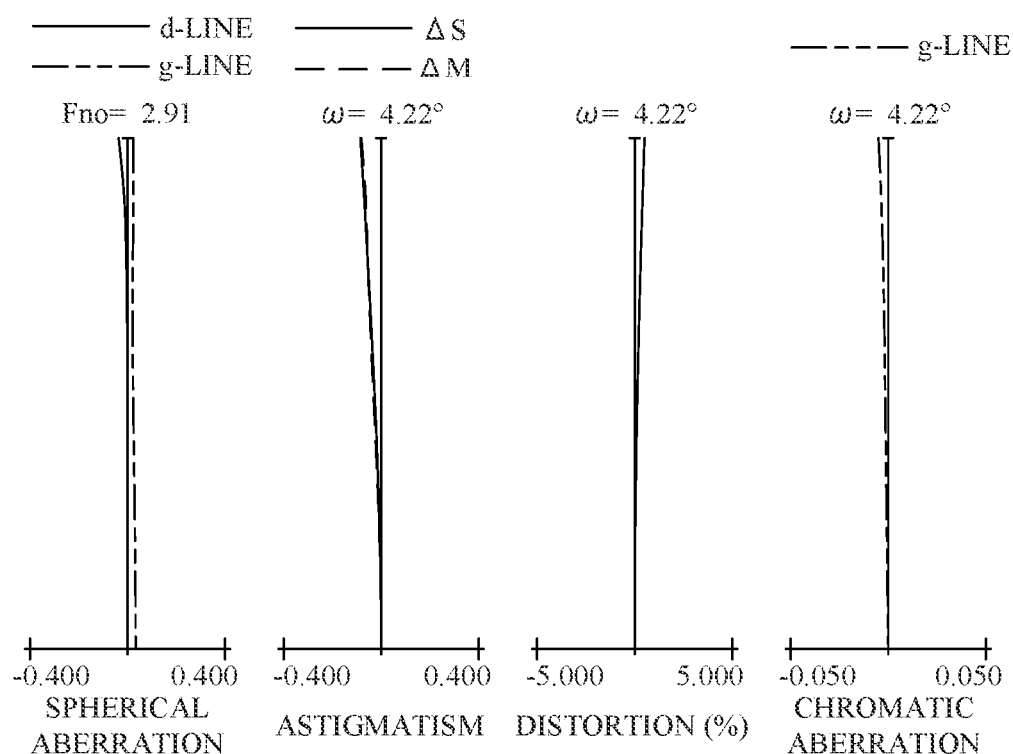
Figure 5:
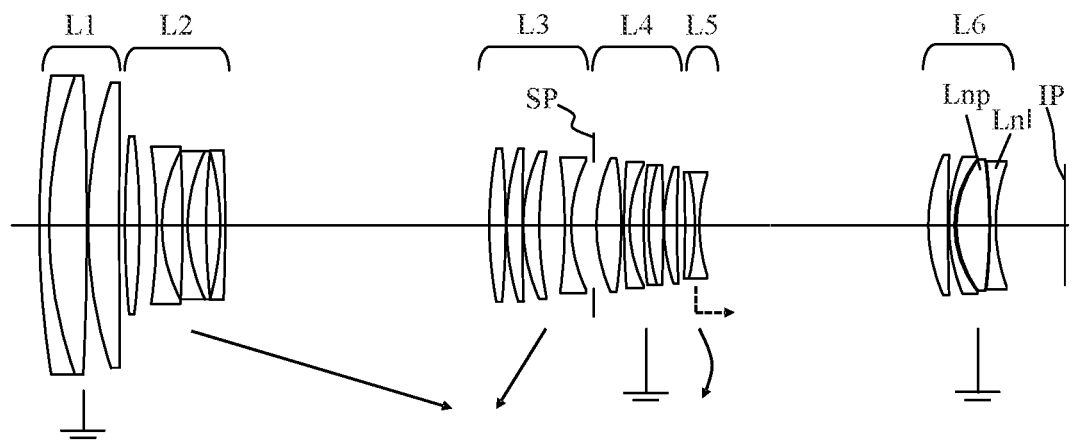
FIG. 5 is a sectional view of a zoom lens according to Example 3 at a wide-angle end.
Figure 6A:
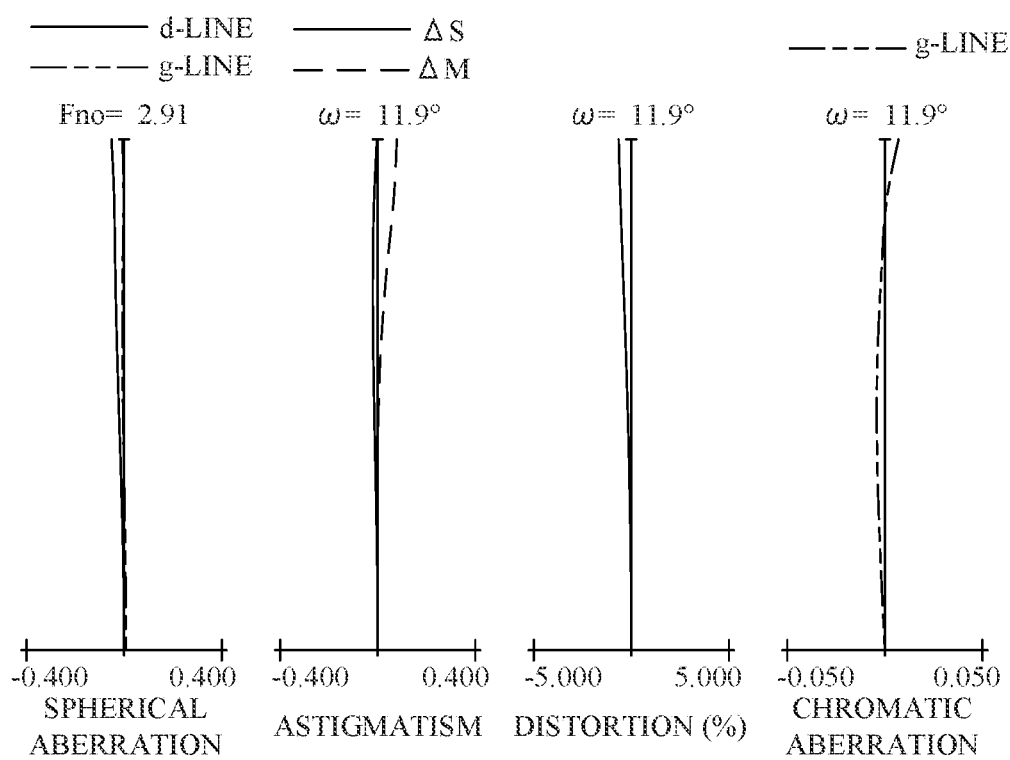
FIGS. 6A, 6B, and 6C are aberration diagrams at the wide-angle end, an intermediate zoom position, and a telephoto end of the zoom lens according to Example 3.
Figure 6B:
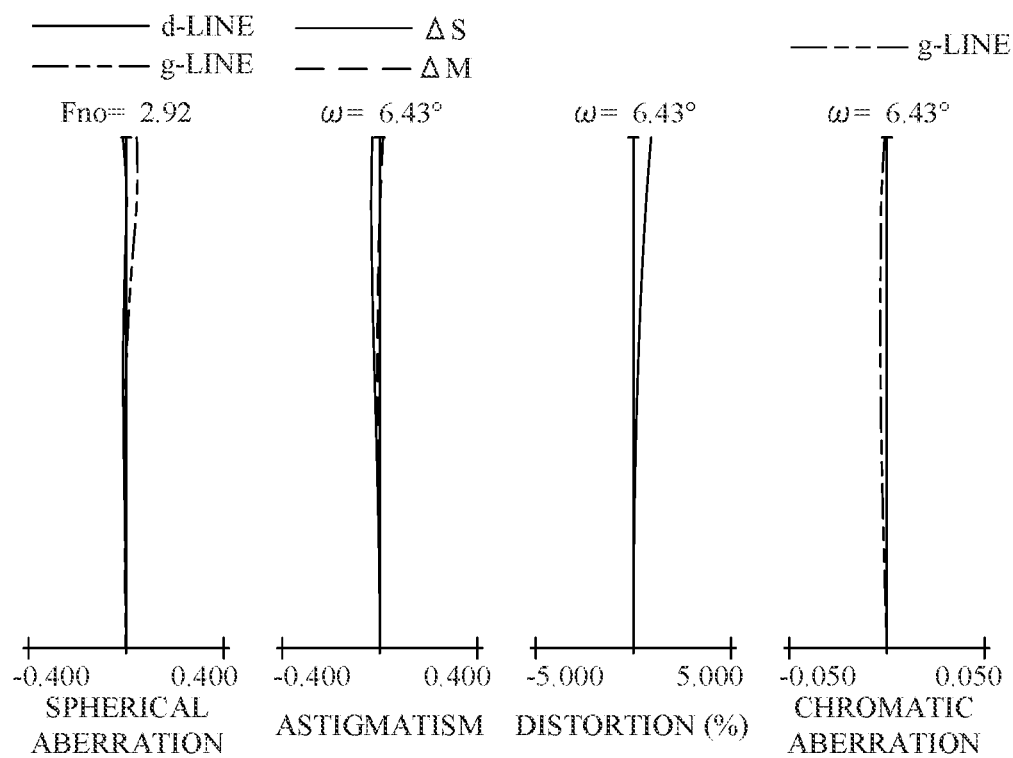
Figure 6C:
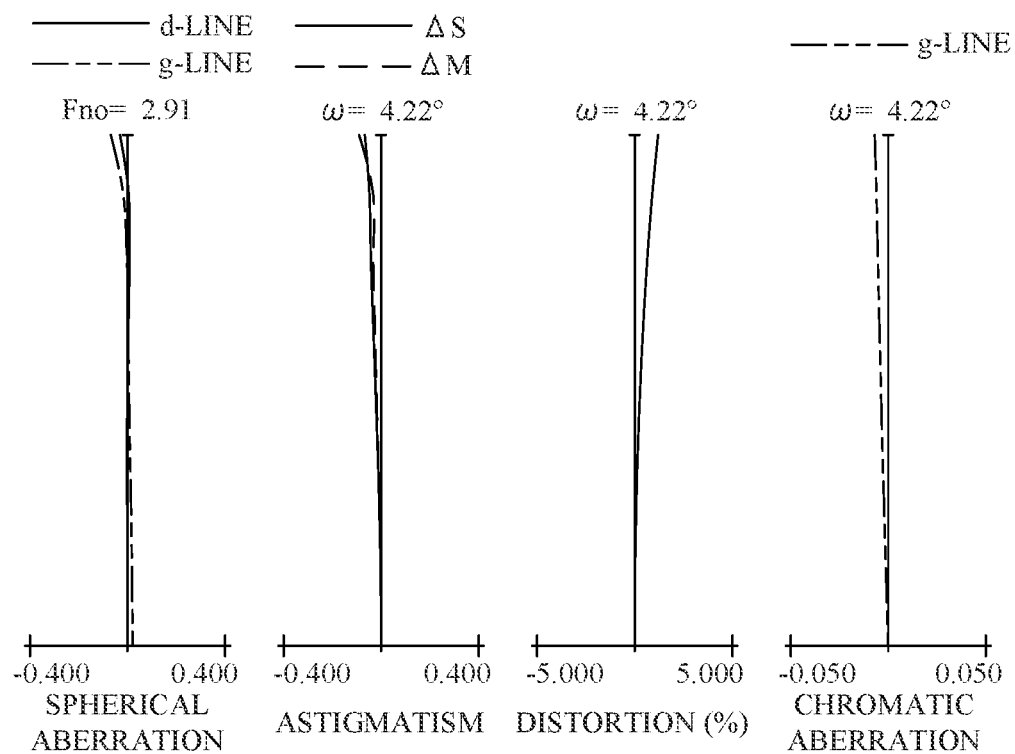
Figure 7:
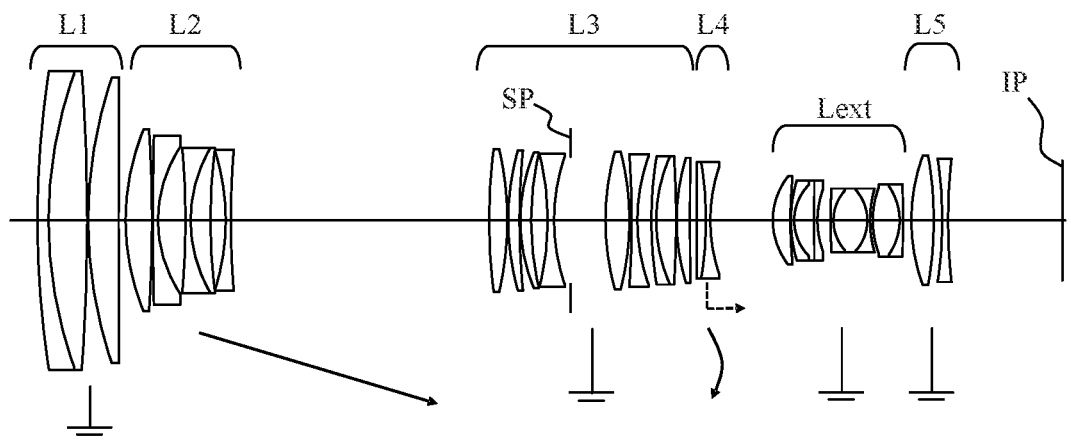
FIG. 7 is a sectional view of a zoom lens according to Example 4 at a wide-angle end.
Figure 8A:
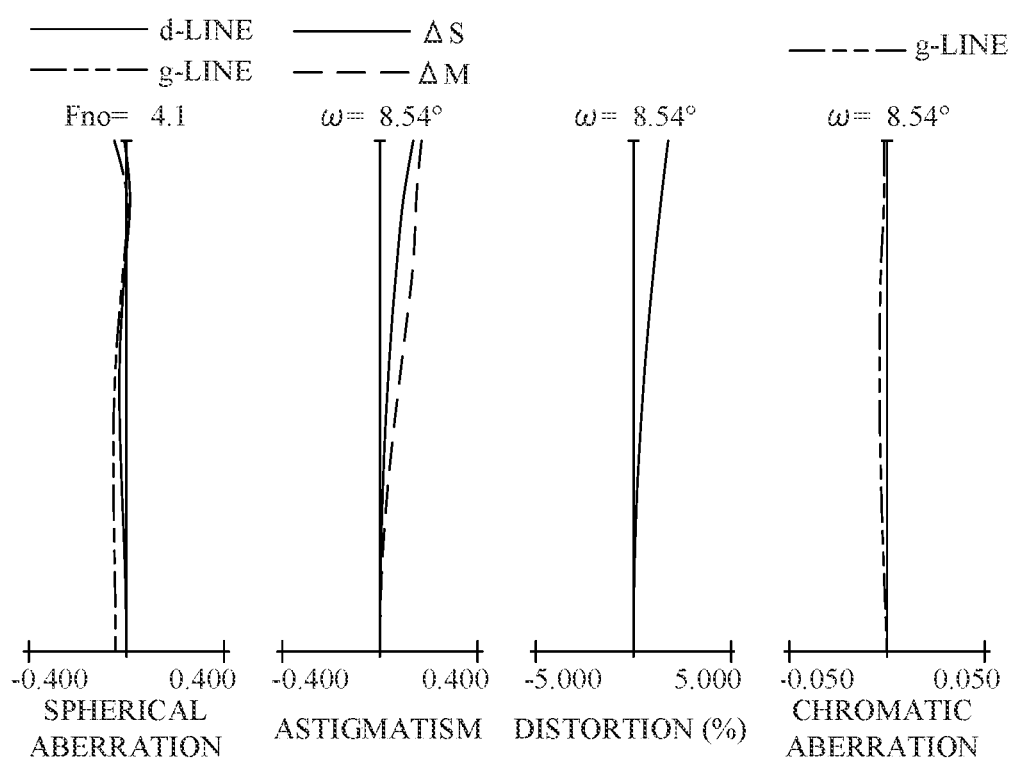
FIGS. 8A, 8B, and 8C are aberration diagrams at the wide-angle end, an intermediate zoom position, and a telephoto end of the zoom lens according to Example 4.
Figure 8B:
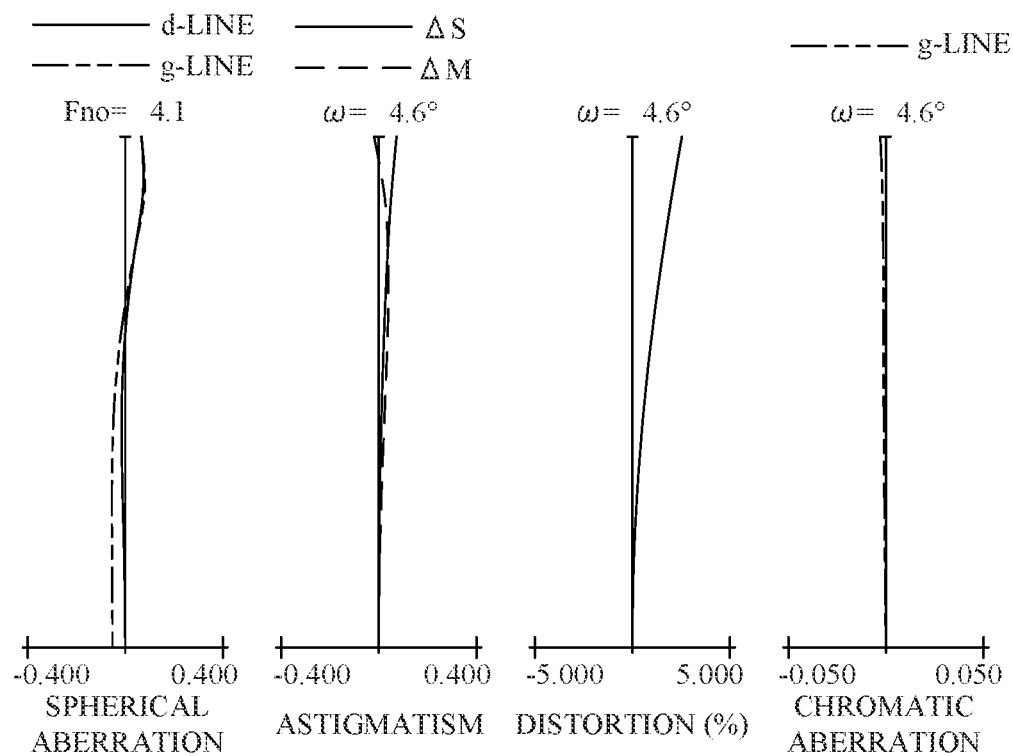
Figure 8C:
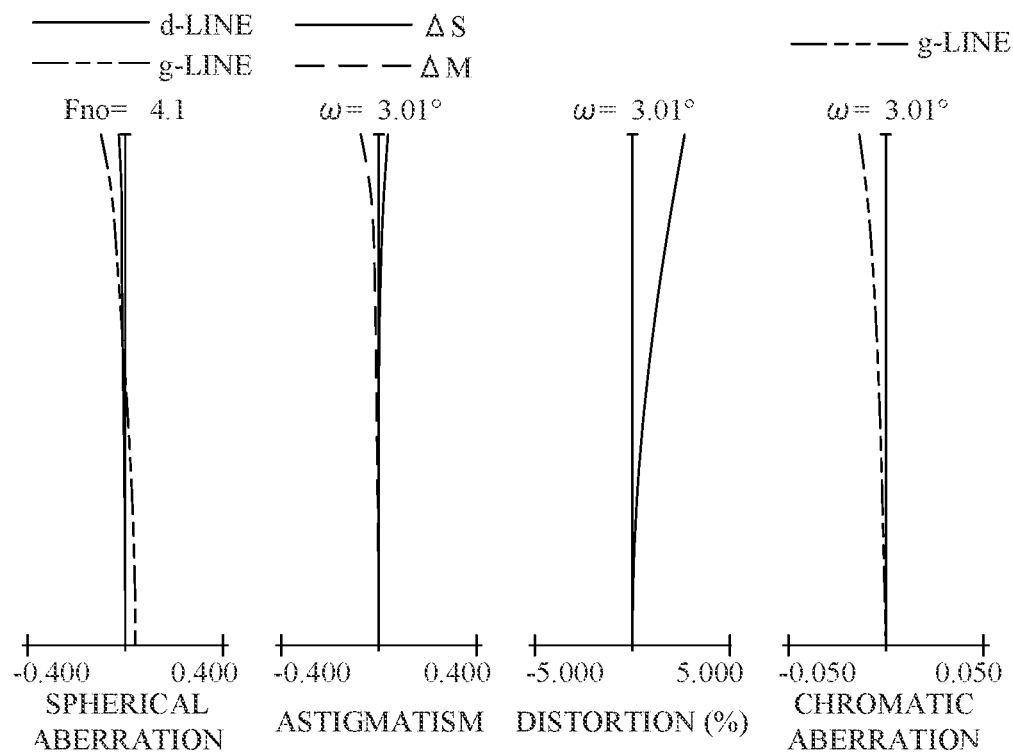
Figure 9:
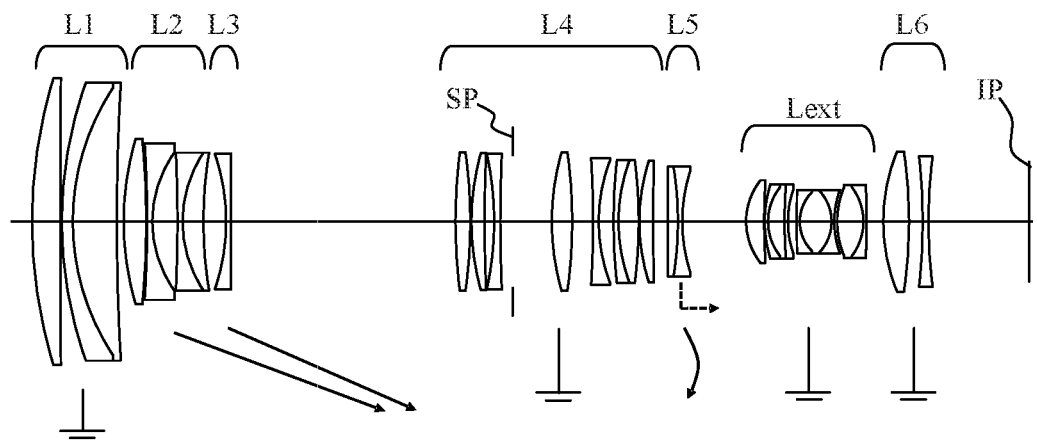
FIG. 9 is a sectional view of a zoom lens according to Example 5 at a wide-angle end.
Figure 10A:
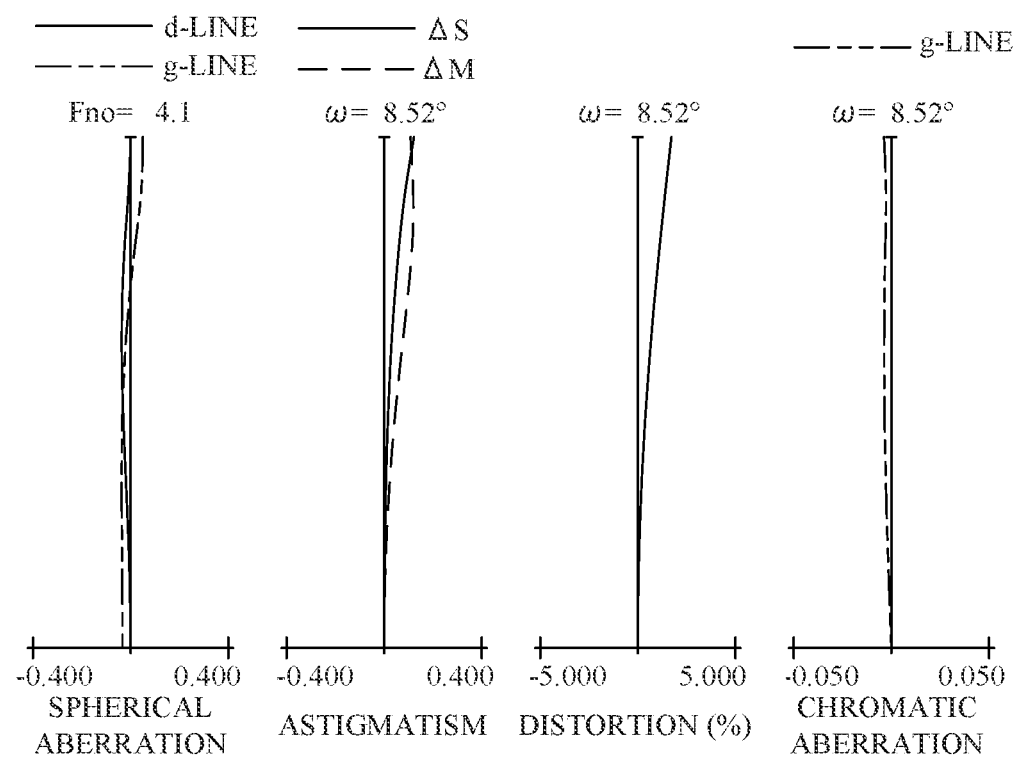
FIGS. 10A, 10B, and 10C are aberration diagrams at the wide-angle end, an intermediate zoom position, and a telephoto end of the zoom lens according to Example 5.
Figure 10B:
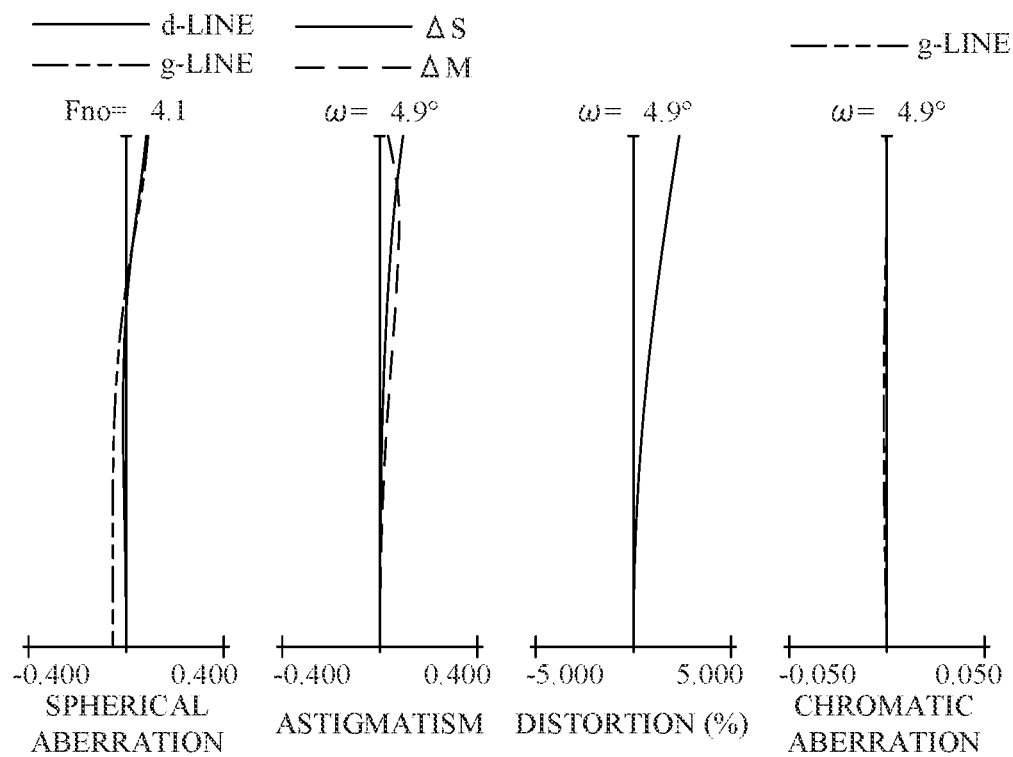
Figure 10C:
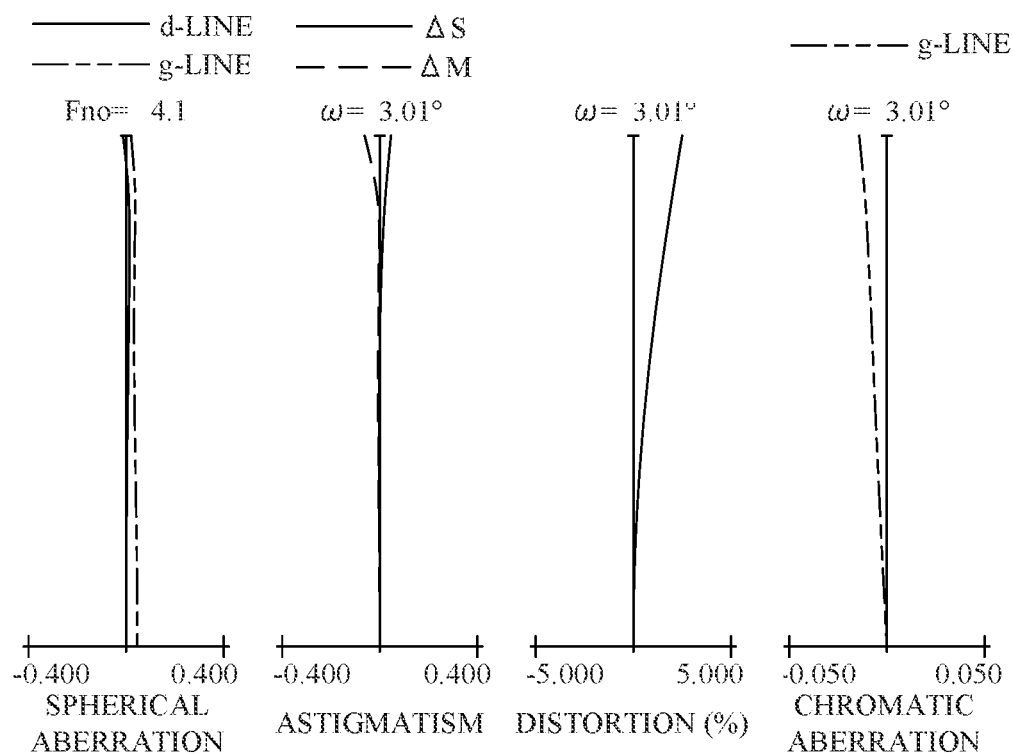
Figure 11:
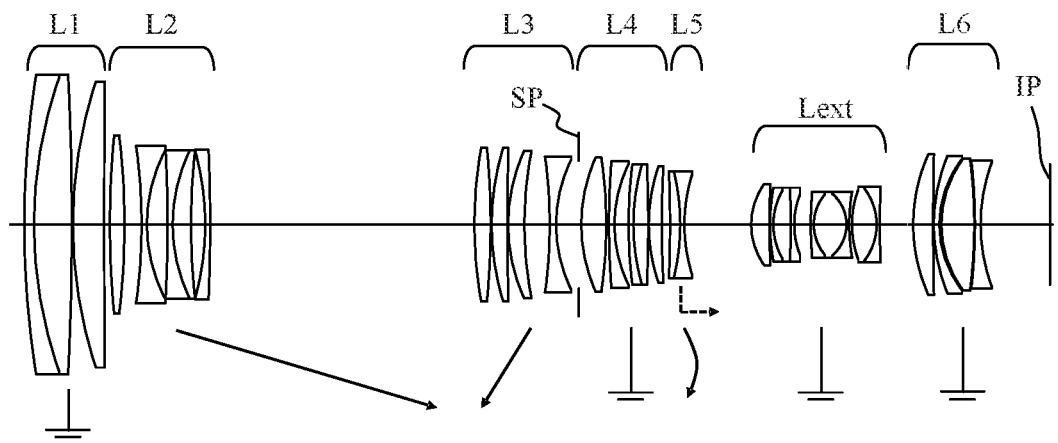
FIG. 11 is a sectional view of a zoom lens according to Example 6 at a wide-angle end.
Figure 12A:
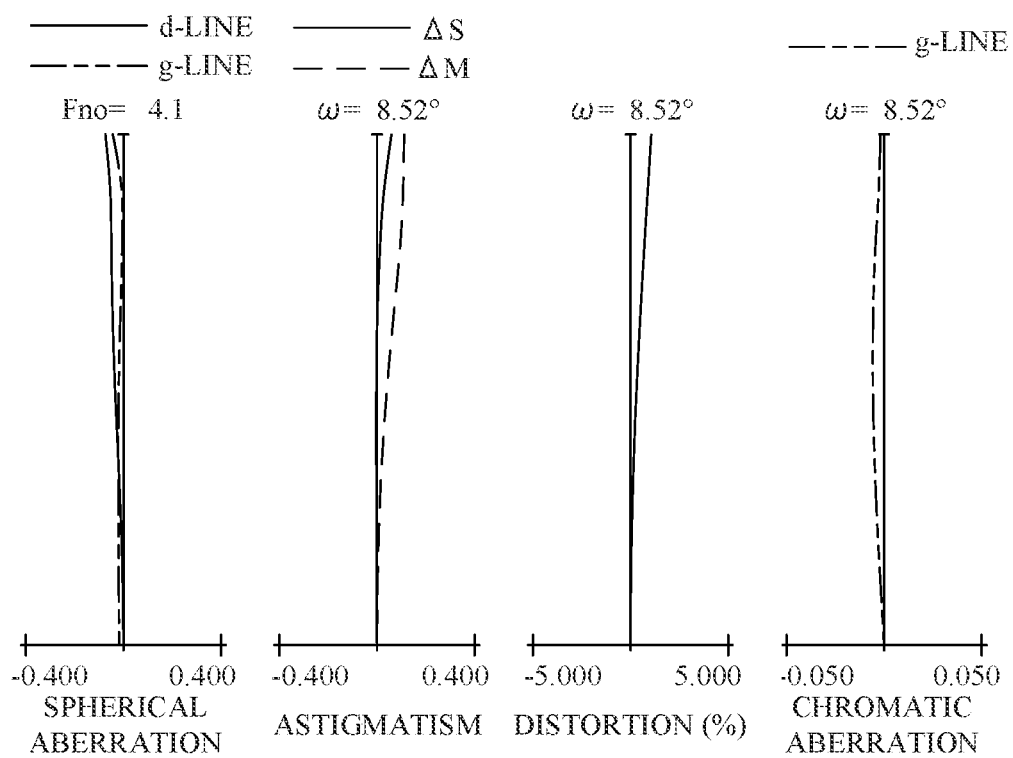
FIGS. 12A, 12B, and 12C are aberration diagrams at the wide-angle end, an intermediate zoom position, and a telephoto end of the zoom lens according to Example 6.
Figure 12B:
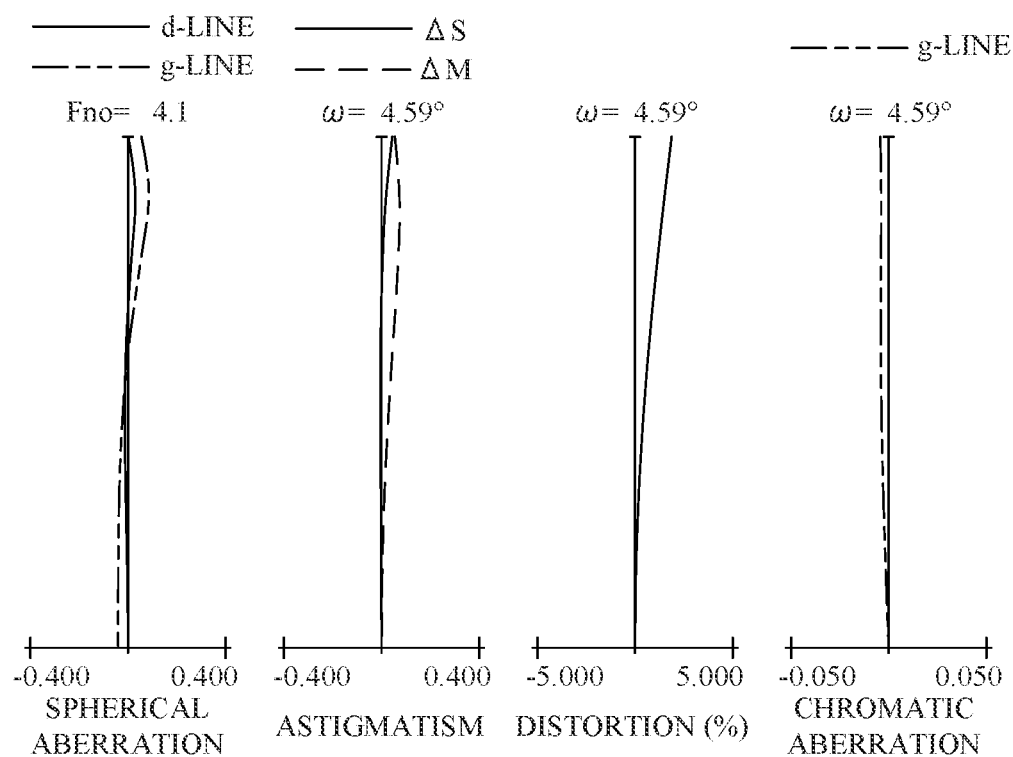
Figure 12C:
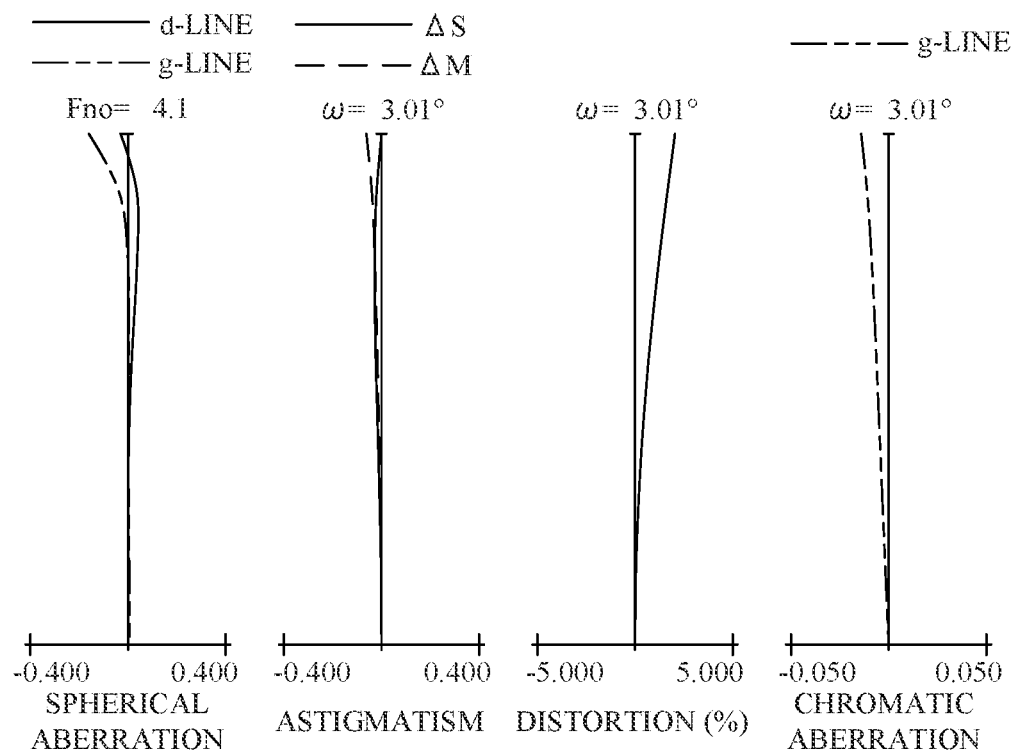

Referring now to the accompanying drawings, a detailed description will be given of embodiments according to the disclosure. Corresponding elements in respective figures will be designated by the same reference numerals, and a duplicate description thereof will be omitted.

FIGS. 1, 3, 5, 7, 9, and 11 are sectional views of zoom lenses according to Examples 1 to 6 at a wide-angle end, respectively. The zoom lens according to each example is used for an image pickup apparatus, such as a digital video camera, a digital still camera, a broadcasting camera, a film-based camera, and a surveillance camera.

In each lens sectional view, a left side is an object side and a right side is an image side. The zoom lens according to each example includes a plurality of lens units. In this specification, a lens unit is a group of lenses that is moved or stands still integrally during zooming. That is, in the zoom lens according to each example, a distance between adjacent lens units is changed during zooming. The lens unit may include one or more lenses. The lens unit may include a diaphragm (aperture stop).

The zoom lens according to each example includes, in order from the object side to the image side, a first lens unit L1 having a positive refractive power, a second lens unit L2 having a negative refractive power, and a rear group including a plurality of lens units.

SP denotes the diaphragm (aperture stop). IP denotes an image plane, and when the zoom lens according to each example is used as an imaging optical system of a digital still camera or a digital video camera, an image plane of a solid-state image sensor (photoelectric conversion element) such as a CCD sensor or a CMOS sensor is placed on the image plane IP. When the optical system according to each example is used as an imaging optical system of a film-based camera, a photosensitive surface corresponding to a film plane is placed on the image plane IP.

In the zoom lens according to each example, each lens unit is moved as illustrated by a solid arrow during zooming from the wide-angle end to the telephoto end. In the zoom lens according to each example, each lens unit is moved as illustrated by a dotted arrow during focusing from an infinity object (object at infinity) to a short-distance (or close or near) object.

FIGS. 2A, 4A, 6A, 8A, 10A, and 12A are aberration diagrams at the wide-angle end of the zoom lenses according to Examples 1 to 6, respectively. FIGS. 2B, 4B, 6B, 8B, 10B, and 12B are aberration diagrams at an intermediate zoom position of the zoom lenses according to Examples 1 to 6, respectively. FIGS. 2C, 4C, 6C, 8C, 10C, and 12C are aberration diagrams at a telephoto end of the zoom lenses according to Examples 1 to 6, respectively.

In the spherical aberration diagram, Fno denotes an F-number and indicates spherical aberration amounts for the d-line (wavelength 587.6 nm) and the g-line (wavelength 435.8 nm). In the astigmatism diagram, $\Delta S$ denotes an astigmatism amount on a sagittal image plane, and $\Delta M$ denotes an astigmatism amount on a meridional image plane. A distortion diagram illustrates a distortion amount for the d-line. A chromatic aberration diagram illustrates a chromatic aberration amount for the g-line. $\omega$ is an imaging half angle of view (degrees).

Next follows a description of a characteristic configuration of the zoom lens according to each example.

The rear group includes the diaphragm SP, an n-th lens unit disposed closest to the image plane and having a positive refractive power, and an (n−1)-th lens unit adjacently disposed on the object side of the n-th lens unit and having a negative refractive power.

In the zoom lens according to each example, an extender (magnification conversion unit) configured to convert the magnification of the zoom lens is placed in a space between the n-th lens unit in which the on-axis light beam (luminous flux) is converged and the (n−1)-th lens unit adjacently disposed on the object side of the n-th lens unit, and the extender is attachable to and detachable from the zoom lens. This configuration can reduce the size of the extender. The extender may not be integrated with a lens apparatus having the zoom lens according to each example, and an extender separate from the lens apparatus may be attached to the lens apparatus. That is, the zoom lens according to each example can be used without the extender.

Since the n-th lens unit is located near the image plane, it has a positive refractive power to ensure telecentricity on the image side. If the n-th lens unit has the positive refractive power and the (n−1)-th lens unit has a positive refractive power, the overall lens length becomes too long in order to achieve a long focal length on the telephoto side, and it becomes difficult to reduce the size of the zoom lens. Thus, the (n−1)-th lens unit has the negative refractive power. The overall lens length is a distance on the optical axis from the lens surface closest to the object to the image plane.

The zoom lens according to each example satisfies the following inequalities (1) and (2):

$$-0.7 < fn-1/fn < -0.1 \quad (1)$$

$$0.3 < Lnm/Lsi < 0.7 \quad (2)$$

Here, fn−1 is a focal length of the (n−1)-th lens unit. fn is a focal length of the n-th lens unit. Lnm is a (first) distance on the optical axis from the lens surface closest to the image plane of the (n−1)-th lens unit to the lens surface closest to the object of the n-th lens unit at the zoom position Zm. Lsi is a distance on the optical axis from the diaphragm SP to the image plane at the zoom position Zm. The zoom position Zm is a zoom position that minimizes the (first) distance on the optical axis from the lens surface closest to the image plane of the (n−1)-th lens unit to the lens surface closest to the object of the n-th lens unit in the entire zoom range.

The inequality (1) defines a relationship between the focal length of the (n−1)-th lens unit and the focal length of the n-th lens unit. Satisfying the inequality (1) can reduce the size of the zoom lens and achieve a good aberration correction while maintaining an air gap for inserting the extender into a space between the n-th lens unit and the (n−1)-th lens unit. In a case where the focal length of the (n−1)-th lens unit becomes shorter and the value becomes higher than the upper limit of the inequality (1), it becomes difficult to satisfactorily correct off-axis aberration while the air gap for inserting the extender is maintained. In a case where the focal length of the (n−1)-th lens unit becomes longer and the value becomes lower than the lower limit of the inequality (1), the overall lens length becomes too long.

The inequality (2) defines a relationship between the distance on the optical axis from the lens surface closest to the image plane of the (n−1)-th lens unit to the lens surface closest to the object of the n-th lens unit at the zoom position Zm, and the distance on the optical axis from the image plane to the diaphragm SP. Satisfying the inequality (2) can sufficiently secure the air gap for inserting the extender while suppressing a size increase of the zoom lens. In a case where the distance on the optical axis from the lens surface closest to the image plane of the (n−1)-th lens unit to the lens surface closest to the object of the n-th lens unit at the zoom position Zm becomes longer and the value becomes higher than the upper limit of the inequality (2), the zoom lens becomes too large. In a case where the distance on the optical axis from the lens surface closest to the image plane of the (n−1)-th lens unit to the lens surface closest to the object of the n-th lens unit at the zoom position Zm becomes shorter and the value becomes lower than the lower limit of the inequality (2), it becomes difficult to insert the extender.

Satisfying the above configuration can realize a zoom lens having a large aperture diameter and a long focal length, which can easily change a focal length range to a long focal length side by inserting an extender into a main optical system and can maintain good optical performance before and after the extender is inserted.

The numerical ranges of the inequalities (1) and (2) may be replaced with those of the following inequalities (1a) and (2a):

$$-0.6 < fn-1/fn < -0.2 \quad (1a)$$

$$0.32 < Lnm/Lsi < 0.60 \quad (2a)$$

The numerical ranges of the inequalities (1) and (2) may be replaced with those of the following inequalities (1b) and (2b):

$$-0.5 < fn-1/fn < -0.3 \quad (1b)$$

$$0.35 < Lnm/Lsi < 0.50 \quad (2b)$$

Next follows a description of the configuration to be satisfied by the zoom lens according to each example.

The (n−1)-th lens unit may be moved with a convex locus toward the image side during zooming from the wide-angle end to the telephoto end. This configuration can satisfactorily correct off-axis aberration such as a curvature of field while maintaining the central imaging position constant in the entire zoom range.

The zoom lens according to each example may satisfy one or more of the following inequalities (3) to (6):

$$0.7 < f1/ft < 1.1 \quad (3)$$

$$0.88 < Lnw/Lnt < 1.10 \quad (4)$$

$$-0.60 < fnl/fn < -0.15 \quad (5)$$

$$-1.0 < fnp/fnl < -0.6 \quad (6)$$

Here, f1 is a focal length of the first lens unit L1. ft is a focal length of the zoom lens at the telephoto end. Lnw is a distance on the optical axis from the lens surface closest to the image plane of the (n−1)-th lens unit to the lens surface closest to the object of the n-th lens unit at the wide-angle end. Lnt is a distance on the optical axis from the lens surface closest to the image plane of the (n−1)-th lens unit to the lens surface closest to the object of the n-th lens unit at the telephoto end. fnl is a focal length of a lens Lnl disposed closest to the image plane in the n-th lens unit. fnp is a focal length of a lens Lnp having the largest positive refractive power in the n-th lens unit.

The inequality (3) defines a relationship between the focal length of the first lens unit L1 and the focal length of the zoom lens at the telephoto end. Satisfying the inequality (3) can achieve both miniaturization of the zoom lens and corrections of longitudinal and lateral chromatic aberrations at the telephoto end. In a case where the focal length of the first lens unit L1 becomes longer and the value becomes higher than the upper limit of the inequality (3), the overall lens length becomes long and the zoom lens becomes large. In a case where the focal length of the first lens unit L1 becomes shorter and the value is lower than the lower limit of the inequality (3), it becomes difficult to correct the longitudinal and lateral chromatic aberrations at the telephoto end.

The inequality (4) defines a relationship between the distance on the optical axis from the lens surface closest to the image plane of the (n−1)-th lens unit to the lens surface closest to the object of the n-th lens unit at the wide-angle end and that at the telephoto end. Satisfying the inequality (4) can satisfactorily correct off-axis aberrations such as a curvature of field and lateral chromatic aberration while sufficiently securing the air gap for inserting the extender in the entire zoom range. In a case where the distance on the optical axis from the lens surface closest to the image plane of the (n−1)-th lens unit to the lens surface closest to the object of the n-th lens unit at the wide-angle end is longer and the value is higher than the upper limit of the inequality (4), it is difficult to correct a curvature of field and lateral chromatic aberration at the wide-angle end. In a case where the distance on the optical axis from the lens surface closest to the image plane of the (n−1)-th lens unit to the lens surface closest to the object of the n-th lens unit at the telephoto end becomes longer and the value becomes lower than the lower limit of the inequality (4), it becomes difficult to correct a curvature of field and lateral chromatic aberration at the telephoto end.

The inequality (5) defines a relationship between the focal length of the lens Lnl disposed on the image side of the n-th lens unit and the focal length of the n-th lens unit. Satisfying the inequality (5) can satisfactorily correct off-axis aberration such as distortion on the wide-angle end while securing telecentricity on the image side. In a case where the focal length of the lens Lnl becomes shorter and the value becomes higher than the upper limit of the inequality (5), it becomes difficult to secure the telecentricity on the image side. In a case where the focal length of the lens Lnl becomes longer and the value becomes lower than the lower limit of the inequality (5), it becomes difficult to correct off-axis aberration such as distortion on the wide-angle side.

The inequality (6) defines a relationship between the focal length of the lens Lnp having the strongest positive refractive power in the n-th lens unit and the focal length of the lens Lnl disposed closest to the image plane of the n-th lens unit. Satisfying the inequality (6) can satisfactorily correct off-axis aberrations such as a curvature of field and distortion on the telephoto side. In a case where the focal length of the lens Lnp becomes shorter and the value is higher than the upper limit of the inequality (6), it becomes difficult to correct off-axis aberration such as a curvature of field on the telephoto side. In a case where the focal length of the lens Lnp is longer and the value is lower than the lower limit of the inequality (6), it becomes difficult to correct distortion on the telephoto side.

The numerical ranges of the inequalities (3) to (6) may be replaced with those of the following inequalities (3a) to (6a):

$$0.75 < f1/ft < 1.00 \quad (3a)$$

$$0.93 < Lnw/Lnt < 1.06 \quad (4a)$$

$$-0.50 < fnl/fn < -0.18 \quad (5a)$$

$$-0.95 < fnp/fnl < -0.68 \quad (6a)$$

The numerical ranges of the inequalities (3) to (6) may be replaced with those of the following inequalities (3b) to (6b).

$$0.80 < f1/ft < 0.95 \quad (3b)$$

$$0.95 < Lnw/Lnt < 1.02 \quad (4b)$$

$$-0.45 < fnl/fn < -0.23 \quad (5b)$$

$$-0.90 < fnp/fnl < -0.75 \quad (6b)$$

Next, the zoom lens according to each example will be described in detail.

The zoom lens according to Example 1 includes, in order from the object side to the image side, a first lens unit L1 to a fifth lens unit L5 having positive, negative, positive, negative, and positive refractive powers.

The zoom lens according to Example 2 includes, in order from the object side to the image side, a first lens unit L1 to a sixth lens unit L6 having positive, negative, negative, positive, negative, and positive refractive powers.

The zoom lens according to Example 3 includes, in order from the object side to the image side, a first lens unit L1 to a sixth lens unit L6 having positive, negative, positive, positive, negative, and positive refractive powers.

The zoom lens according to Example 4 corresponds to the zoom lens according to Example 1 in which an extender Lext having a negative refractive power is inserted into a space between the fourth lens unit L4 and the fifth lens unit L5.

The zoom lens according to Example 5 corresponds to the zoom lens according to Example 2 in which the extender Lext having the negative refractive power is inserted into a space between the fifth lens unit L5 and the sixth lens unit L6.

The zoom lens according to Example 6 corresponds to the zoom lens according to Example 3 in which the extender Lext having the negative refractive power is inserted into a space between the fifth lens unit L5 and the sixth lens unit L6.

In the zoom lenses according to Examples 1, 3, 4, and 6, the first lens unit L1 consists of, in order from the object side to the image side, a cemented lens consisting of a negative lens and a positive lens, and a positive lens. In the zoom lenses according to Examples 2 and 5, the first lens unit L1 consists of, in order from the object side to the image side, a positive lens, and a cemented lens consisting of a negative lens and a positive lens. These configurations can satisfactorily correct spherical aberration, and longitudinal and lateral chromatic aberrations at the telephoto end even with a large aperture diameter.

The fifth lens unit L5 according to Examples 1 and 4 and the sixth lens unit L6 according to Examples 2 and 5 consists of, in order from the object side to the image side, a positive lens and a negative lens. The sixth lens unit L6 according to Examples 3 and 6 consists of, in order from the object side to the image side, a positive lens, a negative lens, a positive lens, and a negative lens. Thus, the lens unit closest to the image plane includes the negative lens closest to the image plane and the positive lens on the object side of the negative lens. This configuration can secure telecentricity on the image side in the entire zoom range, and satisfactorily correct a curvature of field and distortion.

The extender Lext includes, in order from the object side to the image side, a positive lens, a first cemented lens consisting of a negative lens, a positive lens, and a negative lens, and a second cemented lens consisting of a negative lens, a positive lens, and a negative lens, and a third cemented lens consisting of a positive lens and a negative lens. The first cemented lens has a negative refractive power, the second cemented lens has a negative refractive power, and the third cemented lens has a positive refractive power. This configuration can sufficiently converge a light beam incident on the extender from the main optical system, and thus can make small the extender, and satisfactorily correct various aberrations generated by the extender while maintaining a sufficient magnification conversion action.

In the zoom lenses according to Examples 1 and 4, during zooming from the wide-angle end to the telephoto end, the first lens unit L1, the third lens unit L3, and the fifth lens unit L5 are fixed (immobile), the second lens unit L2 is moved to the object side, and the fourth lens unit L4 is moved to the image side with a convex locus.

In the zoom lenses according to Examples 2, 3, 5, and 6, during zooming from the wide-angle end to the telephoto end, the first lens unit L1, the fourth lens unit L4, and the sixth lens unit L6 are fixed, the second lens unit L2 is moved to the object side, and the fifth lens unit L5 is moved to the image side with a convex locus.

In the zoom lenses according to Examples 4, 5, and 6, the extender Lext is fixed during zooming from the wide-angle end to the telephoto end.

In Examples 1 and 4, the fourth lens unit L4 is moved with a convex locus during zooming from the wide-angle end to the telephoto end. In Examples 2, 3, 5, and 6, the fifth lens unit L5 is moved with a convex locus during zooming from the wide-angle end to the telephoto end. This configuration can satisfactorily correct off-axis aberration such as a curvature of field while maintaining the central imaging position constant in the entire zoom range.

In the zoom lenses according to Examples 1 and 4, the fourth lens unit L4, which is a focus unit, is moved to the image side during focusing from an infinity object to a short-distance object.

In the zoom lenses according to Examples 2, 3, 5, and 6, the fifth lens unit L5, which is a focus unit, is moved to the image side during focusing from an infinity object to a short-distance object.

The fourth lens unit L4 in the zoom lenses according to Examples 1 and 4 and the fifth lens unit L5 in Examples 2, 3, 5, and 6 include a cemented lens consisting of a positive lens and a negative lens. This configuration can reduce the weight of the focus unit while satisfactorily suppressing fluctuations in various aberrations caused by fluctuations in an object distance.

A description will now be given of numerical examples 1 to 6 corresponding to Examples 1 to 6, respectively.

In surface data of each numerical example, r represents a radius of curvature of each optical surface, and d (mm) represents an on-axis distance (distance on the optical axis) between an m-th surface and an (m+1)-th surface, where m is a surface number counted from the light incident side. nd represents a refractive index of each optical element for the d-line, and νd represents an Abbe number of the optical element. The Abbe number νd of a certain material is calculated as follows:

$$\nu d=(Nd-1)/(NF-NC)$$

where Nd, NF, and NC are refractive indexes in the Fraunhofer line for the d-line (587.6 nm), the F-line (486.1 nm), and the C-line (656.3 nm).

In each numerical example, each of d, focal length (mm), F-number, and half angle of view (degrees) has a value when the zoom lens according to each example is focused on an infinite object. A "back focus" is a distance on the optical axis from the final surface of the lens (the lens surface closest to the image plane) to the paraxial image plane in terms of air equivalent length. An "overall lens length" is a length obtained by adding the back focus to the distance on the optical axis from the frontmost surface (the lens surface closest to the object) to the final surface of the zoom lens. The "lens unit" may include one or more lenses.

NUMERICAL EXAMPLE 1
UNIT: mm
Surface Data

| Surface No. | r | d | nd | νd |
|---|---|---|---|---|
| 1 | 348.214 | 4.00 | 1.67300 | 38.3 |
| 2 | 155.532 | 14.01 | 1.43875 | 94.7 |
| 3 | −713.399 | 0.30 | | |
| 4 | 159.388 | 11.00 | 1.43875 | 94.7 |

-continued

NUMERICAL EXAMPLE 1
UNIT: mm
Surface Data

| Surface No. | r | d | nd | vd |
|---|---|---|---|---|
| 5 | 6056.224 | (Variable) | | |
| 6 | 85.693 | 9.59 | 1.65412 | 39.7 |
| 7 | −482.320 | 0.30 | | |
| 8 | 1229.057 | 1.80 | 1.60342 | 38.0 |
| 9 | 47.388 | 10.00 | | |
| 10 | −280.812 | 1.80 | 1.49700 | 81.5 |
| 11 | 51.380 | 7.13 | 1.91082 | 35.3 |
| 12 | 194.966 | 5.57 | | |
| 13 | −82.611 | 1.80 | 1.72916 | 54.7 |
| 14 | 293.893 | (Variable) | | |
| 15 | 196.900 | 6.61 | 1.49700 | 81.5 |
| 16 | −114.138 | 0.30 | | |
| 17 | 93.409 | 4.07 | 1.49700 | 81.5 |
| 18 | 252.342 | 0.30 | | |
| 19 | 63.068 | 3.87 | 1.49700 | 81.5 |
| 20 | 103.727 | 6.11 | | |
| 21 | −93.470 | 2.20 | 1.48749 | 70.2 |
| 22 | 71.054 | 5.98 | | |
| 23(Diaphragm) | ∞ | 12.58 | | |
| 24 | 92.191 | 8.70 | 1.59522 | 67.7 |
| 25 | −96.989 | 0.81 | | |
| 26 | −314.351 | 2.00 | 1.61340 | 44.3 |
| 27 | 67.755 | 5.00 | | |
| 28 | 135.609 | 1.80 | 1.85478 | 24.8 |
| 29 | 55.827 | 7.22 | 1.59282 | 68.6 |
| 30 | −345.354 | 0.15 | | |
| 31 | 76.673 | 4.86 | 1.87070 | 40.7 |
| 32 | 5031.140 | (Variable) | | |
| 33 | −10122.483 | 3.34 | 1.89286 | 20.4 |
| 34 | −122.717 | 1.50 | 1.67300 | 38.1 |
| 35 | 59.654 | (Variable) | | |
| 36 | 67.735 | 8.22 | 1.63980 | 34.5 |
| 37 | −127.121 | 3.04 | | |
| 38 | −141.175 | 2.00 | 2.00100 | 29.1 |
| 39 | 191.628 | 41.27 | | |
| Image Plane | ∞ | | | |

Various Data
ZOOM RATIO 2.85

| | WIDE-ANGLE | MIDDLE | TELEPHOTO |
|---|---|---|---|
| Focal Length: | 103.00 | 192.20 | 294.00 |
| FNO | 2.91 | 2.91 | 2.91 |
| Half Angle of View (degrees) | 11.86 | 6.42 | 4.21 |
| Image Height | 21.64 | 21.64 | 21.64 |
| Overall lens length | 370.00 | 370.00 | 370.00 |
| BF | 41.27 | 41.27 | 41.27 |
| d 5 | 2.50 | 59.47 | 94.39 |
| d14 | 93.24 | 36.27 | 1.35 |
| d32 | 2.46 | 6.30 | 2.00 |
| d35 | 72.56 | 68.73 | 73.03 |

Zoom Lens Unit Data
Starting Surface

| Lens | Unit Starting Surface | Focal Length: |
|---|---|---|
| 1 | 1 | 270.20 |
| 2 | 6 | −83.96 |
| 3 | 15 | 70.76 |
| 4 | 33 | −104.57 |
| 5 | 36 | 324.38 |

Single Lens Data

| Lens | Starting Surface | Focal Length: |
|---|---|---|
| 1 | 1 | −421.17 |
| 2 | 2 | 292.48 |
| 3 | 4 | 372.88 |
| 4 | 6 | 111.99 |
| 5 | 8 | −81.73 |
| 6 | 10 | −87.23 |
| 7 | 11 | 74.82 |
| 8 | 13 | −88.26 |
| 9 | 15 | 146.41 |
| 10 | 17 | 295.89 |
| 11 | 19 | 313.81 |
| 12 | 21 | −82.45 |
| 13 | 24 | 80.79 |
| 14 | 26 | −90.69 |
| 15 | 28 | −112.18 |
| 16 | 29 | 81.61 |
| 17 | 31 | 89.38 |
| 18 | 33 | 139.11 |
| 19 | 34 | −59.45 |
| 20 | 36 | 70.22 |
| 21 | 38 | −80.96 |

NUMERICAL EXAMPLE 2
UNIT: mm
Surface Data

| Surface No. | r | d | nd | vd |
|---|---|---|---|---|
| 1 | 176.924 | 10.23 | 1.49700 | 81.5 |
| 2 | 7195.119 | 0.50 | | |
| 3 | 149.004 | 4.00 | 1.67300 | 38.3 |
| 4 | 87.741 | 15.84 | 1.43875 | 94.7 |
| 5 | 824.823 | (Variable) | | |
| 6 | 104.150 | 8.25 | 1.65412 | 39.7 |
| 7 | −292.447 | 0.30 | | |
| 8 | −409.815 | 1.80 | 1.57501 | 41.5 |
| 9 | 42.899 | 9.13 | | |
| 10 | −512.719 | 1.80 | 1.49700 | 81.5 |
| 11 | 44.775 | 7.48 | 1.91082 | 35.3 |
| 12 | 146.745 | (Variable) | | |
| 13 | −75.055 | 1.80 | 1.72916 | 54.7 |
| 14 | −13401.153 | (Variable) | | |
| 15 | 190.237 | 5.48 | 1.59282 | 68.6 |
| 16 | −168.072 | 0.30 | | |
| 17 | 90.590 | 4.76 | 1.49700 | 81.5 |
| 18 | 501.290 | 3.49 | | |
| 19 | −112.677 | 2.20 | 1.65160 | 58.5 |
| 20 | 547.372 | 4.41 | | |
| 21(Diaphragm) | ∞ | 14.16 | | |
| 22 | 90.213 | 7.45 | 1.59522 | 67.7 |
| 23 | −174.714 | 7.47 | | |
| 24 | −357.946 | 2.00 | 1.61340 | 44.3 |
| 25 | 61.677 | 5.34 | | |
| 26 | 195.369 | 1.80 | 1.85478 | 24.8 |
| 27 | 62.924 | 7.38 | 1.59282 | 68.6 |
| 28 | −166.832 | 0.15 | | |
| 29 | 71.433 | 5.02 | 1.87070 | 40.7 |
| 30 | 1004.073 | (Variable) | | |
| 31 | −2872.035 | 3.64 | 1.89286 | 20.4 |
| 32 | −118.966 | 1.50 | 1.67300 | 38.3 |
| 33 | 58.892 | (Variable) | | |
| 34 | 67.037 | 9.34 | 1.67300 | 38.3 |
| 35 | −170.544 | 4.92 | | |
| 36 | −209.118 | 2.00 | 2.00100 | 29.1 |
| 37 | 171.944 | 36.41 | | |
| Image Plane | ∞ | | | |

Various Data
ZOOM RATIO 2.84

| | WIDE-ANGLE | MIDDLE | TELEPHOTO |
|---|---|---|---|
| Focal Length: | 103.00 | 179.84 | 293.00 |
| FNO | 2.91 | 2.91 | 2.91 |
| Half Angle of View (degrees) | 11.86 | 6.86 | 4.22 |
| Image Height | 21.64 | 21.64 | 21.64 |
| Overall lens length | 360.00 | 360.00 | 360.00 |
| BF | 36.41 | 36.41 | 36.41 |
| d 5 | 2.50 | 47.55 | 82.95 |
| d12 | 8.29 | 7.57 | 7.00 |
| d14 | 80.94 | 36.61 | 1.78 |
| d30 | 5.35 | 9.01 | 3.00 |
| d33 | 72.56 | 68.90 | 74.91 |

Zoom Lens Unit Data

| Lens Unit | Starting Surface | Focal Length: |
|---|---|---|
| 1 | 1 | 243.25 |
| 2 | 6 | −279.94 |
| 3 | 13 | −103.52 |
| 4 | 15 | 70.73 |
| 5 | 31 | −101.21 |
| 6 | 34 | 221.00 |

Single Lens Data

| Lens | Starting Surface | Focal Length: |
|---|---|---|
| 1 | 1 | 364.78 |
| 2 | 3 | −325.65 |
| 3 | 4 | 222.33 |
| 4 | 6 | 118.38 |
| 5 | 8 | −67.44 |
| 6 | 10 | −82.77 |
| 7 | 11 | 68.36 |
| 8 | 13 | −103.52 |
| 9 | 15 | 151.39 |
| 10 | 17 | 221.63 |
| 11 | 19 | −143.22 |
| 12 | 22 | 101.01 |
| 13 | 24 | −85.62 |
| 14 | 26 | −109.27 |
| 15 | 27 | 78.01 |
| 16 | 29 | 88.10 |
| 17 | 31 | 138.91 |
| 18 | 32 | −58.33 |
| 19 | 34 | 72.65 |
| 20 | 36 | −94.02 |

NUMERICAL EXAMPLE 3
UNIT: mm
Surface Data

| Surface No. | r | d | nd | νd |
|---|---|---|---|---|
| 1 | 337.251 | 3.50 | 1.72047 | 34.7 |
| 2 | 158.275 | 13.75 | 1.49700 | 81.5 |
| 3 | −1027.574 | 0.30 | | |
| 4 | 163.884 | 11.30 | 1.43875 | 94.7 |
| 5 | 7458.212 | (Variable) | | |
| 6 | 323.613 | 5.43 | 1.67270 | 32.1 |
| 7 | −255.837 | 6.16 | | |
| 8 | −195.213 | 1.80 | 1.51742 | 52.4 |
| 9 | 57.043 | 7.51 | | |
| 10 | −472.171 | 1.80 | 1.49700 | 81.5 |
| 11 | 60.524 | 6.58 | 1.88300 | 40.8 |
| 12 | 228.247 | 5.21 | | |
| 13 | −97.594 | 1.80 | 1.75500 | 52.3 |
| 14 | −557.632 | (Variable) | | |
| 15 | 150.469 | 5.98 | 1.49700 | 81.5 |
| 16 | −278.413 | 0.30 | | |
| 17 | 93.334 | 5.65 | 1.49700 | 81.5 |
| 18 | 843.516 | 0.30 | | |
| 19 | 63.911 | 5.81 | 1.49700 | 81.5 |
| 20 | 132.786 | 9.28 | | |
| 21 | −168.942 | 2.20 | 1.53172 | 48.8 |
| 22 | 52.656 | (Variable) | | |
| 23(Diaphragm) | ∞ | 0.95 | | |
| 24 | 58.788 | 9.10 | 1.59522 | 67.7 |
| 25 | −154.429 | 0.86 | | |
| 26 | 278.909 | 2.00 | 1.73800 | 32.3 |
| 27 | 48.964 | 5.05 | | |
| 28 | 162.568 | 1.80 | 1.72047 | 34.7 |
| 29 | 76.835 | 5.38 | 1.59282 | 68.6 |
| 30 | −457.240 | 0.15 | | |
| 31 | 64.282 | 4.70 | 1.88300 | 40.8 |
| 32 | 348.254 | (Variable) | | |
| 33 | −448.660 | 3.65 | 2.00069 | 25.5 |
| 34 | −82.017 | 1.50 | 1.76385 | 48.5 |
| 35 | 59.367 | (Variable) | | |
| 36 | 61.553 | 7.13 | 1.49700 | 81.5 |
| 37 | 834.029 | 0.30 | | |
| 38 | 64.536 | 2.00 | 1.77250 | 49.6 |
| 39 | 38.148 | 0.70 | | |
| 40 | 39.655 | 11.97 | 1.60342 | 38.0 |
| 41 | −175.599 | 0.20 | | |
| 42 | −198.622 | 2.00 | 1.71736 | 29.5 |
| 43 | 63.810 | 25.00 | | |
| Image Plane | ∞ | | | |

Various Data
ZOOM RATIO 2.84

| | WIDE-ANGLE | MIDDLE | TELEPHOTO |
|---|---|---|---|
| Focal Length: | 103.00 | 192.05 | 293.00 |
| FNO | 2.91 | 2.92 | 2.91 |
| Half Angle of View (degrees) | 11.86 | 6.43 | 4.22 |
| Image Height | 21.64 | 21.64 | 21.64 |
| Overall lens length | 370.00 | 370.00 | 370.00 |
| BF | 25.00 | 25.00 | 25.00 |
| d 5 | 2.00 | 59.04 | 94.00 |
| d14 | 95.20 | 36.92 | 1.20 |
| d22 | 8.15 | 9.39 | 10.15 |
| d32 | 3.00 | 6.63 | 3.00 |
| d35 | 82.56 | 78.93 | 82.56 |

Zoom Lens Unit Data

| Lens Unit | Starting Surface | Focal Length: |
|---|---|---|
| 1 | 1 | 263.22 |
| 2 | 6 | −84.75 |
| 3 | 15 | 246,73 |
| 4 | 23 | 62.39 |
| 5 | 33 | −81.68 |
| 6 | 36 | 199.72 |

Single Lens Data

| Lens | Starting Surface | Focal Length: |
|---|---|---|
| 1 | 1 | −417.38 |
| 2 | 2 | 277.02 |
| 3 | 4 | 381.74 |
| 4 | 6 | 213.20 |
| 5 | 8 | −85.11 |
| 6 | 10 | −107.82 |
| 7 | 11 | 91.59 |
| 8 | 13 | −156.95 |
| 9 | 15 | 197.45 |
| 10 | 17 | 210.63 |
| 11 | 19 | 241.16 |
| 12 | 21 | −75.24 |
| 13 | 24 | 72.69 |
| 14 | 26 | −80.77 |
| 15 | 28 | −204.02 |
| 16 | 29 | 111.38 |
| 17 | 31 | 88.59 |
| 18 | 33 | 99.80 |
| 19 | 34 | −44.88 |
| 20 | 36 | 133.31 |
| 21 | 38 | −124.90 |
| 22 | 40 | 54.76 |
| 23 | 42 | −67.11 |

NUMERICAL EXAMPLE 4
UNIT: mm
Surface Data

| Surface No. | r | d | nd | vd |
|---|---|---|---|---|
| 1 | 348.214 | 4.00 | 1.67300 | 38.3 |
| 2 | 155.532 | 14.01 | 1.43875 | 94.7 |
| 3 | −713.399 | 0.30 | | |
| 4 | 159.388 | 11.00 | 1.43875 | 94.7 |
| 5 | 6056.224 | (Variable) | | |
| 6 | 85.693 | 9.59 | 1.65412 | 39.7 |
| 7 | −482.320 | 0.30 | | |
| 8 | 1229.057 | 1.80 | 1.60342 | 38.0 |
| 9 | 47.388 | 10.00 | | |
| 10 | −280.812 | 1.80 | 1.49700 | 81.5 |
| 11 | 51.380 | 7.13 | 1.91082 | 35.3 |
| 12 | 194.966 | 5.57 | | |
| 13 | −82.611 | 1.80 | 1.72916 | 54.7 |
| 14 | 293.893 | (Variable) | | |
| 15 | 196.900 | 6.61 | 1.49700 | 81.5 |
| 16 | −114.138 | 0.30 | | |
| 17 | 93.409 | 4.07 | 1.49700 | 81.5 |
| 18 | 252.342 | 0.30 | | |
| 19 | 63.068 | 3.87 | 1.49700 | 81.5 |
| 20 | 103.727 | 6.11 | | |
| 21 | −93.470 | 2.20 | 1.48749 | 70.2 |
| 22 | 71.054 | 5.98 | | |
| 23(Diaphragm) | ∞ | 12.58 | | |
| 24 | 92.191 | 8.70 | 1.59522 | 67.7 |
| 25 | −96.989 | 0.81 | | |
| 26 | −314.351 | 2.00 | 1.61340 | 44.3 |
| 27 | 67.755 | 5.00 | | |
| 28 | 135.609 | 1.80 | 1.85478 | 24.8 |
| 29 | 55.827 | 7.22 | 1.59282 | 68.6 |
| 30 | −345.354 | 0.15 | | |
| 31 | 76.673 | 4.86 | 1.87070 | 40.7 |
| 32 | 5031.140 | (Variable) | | |
| 33 | −10122.483 | 3.34 | 1.89286 | 20.4 |
| 34 | −122.717 | 1.50 | 1.67300 | 38.1 |
| 35 | 59.654 | (Variable) | | |
| 36 | 25.645 | 6.36 | 1.59282 | 68.6 |
| 37 | 155.139 | 0.20 | | |
| 38 | 50.156 | 1.20 | 1.77250 | 49.6 |
| 39 | 18.293 | 7.19 | 1.66680 | 33.0 |
| 40 | 1574.067 | 1.20 | 2.00100 | 29.1 |
| 41 | 32.730 | 4.66 | | |
| 42 | 149.830 | 1.10 | 2.00100 | 29.1 |
| 43 | 16.142 | 12.22 | 1.72047 | 34.7 |
| 44 | −16.651 | 1.00 | 1.76385 | 48.5 |
| 45 | 42.035 | 1.00 | | |
| 46 | 34.733 | 9.67 | 1.59551 | 39.2 |
| 47 | −21.544 | 1.20 | 1.76385 | 48.5 |
| 48 | −545.234 | 3.00 | | |
| 49 | 67.735 | 8.22 | 1.63980 | 34.5 |
| 50 | −127.121 | 3.04 | | |
| 51 | −141.175 | 2.00 | 2.00100 | 29.1 |
| 52 | 191.628 | 41.27 | | |
| Image Plane | ∞ | | | |

Various Data
ZOOM RATIO 2.85

| | WIDE-ANGLE | MIDDLE | TELEPHOTO |
|---|---|---|---|
| Focal Length: | 143.99 | 268.68 | 411.00 |
| FNO | 4.10 | 4.10 | 4.10 |
| Half Angle of View (degrees) | 8.54 | 4.60 | 3.01 |
| Image Height | 21.64 | 21.64 | 21.64 |
| Overall lens length | 370.00 | 370.00 | 370.00 |
| BF | 41.27 | 41.27 | 41.27 |
| d 5 | 2.50 | 59.47 | 94.39 |
| d14 | 93.24 | 36.27 | 1.35 |
| d32 | 2.46 | 6.30 | 2.00 |
| d35 | 22.56 | 18.73 | 23.03 |

Zoom Lens Unit Data

| Lens Unit | Starting Surface | Focal Length: |
|---|---|---|
| 1 | 1 | 270.20 |
| 2 | 6 | −83.96 |
| 3 | 15 | 70.76 |
| 4 | 33 | −104.57 |
| EXT | 36 | −114.28 |
| 5 | 50 | 324.38 |

NUMERICAL EXAMPLE 5
UNIT: mm
Surface Data

| Surface No. | r | d | nd | vd |
|---|---|---|---|---|
| 1 | 176.924 | 10.23 | 1.49700 | 81.5 |
| 2 | 7195.119 | 0.50 | | |
| 3 | 149.004 | 4.00 | 1.67300 | 38.3 |
| 4 | 87.741 | 15.84 | 1.43875 | 94.7 |
| 5 | 824.823 | (Variable) | | |
| 6 | 104.150 | 8.25 | 1.65412 | 39.7 |
| 7 | −292.447 | 0.30 | | |
| 8 | −409.815 | 1.80 | 1.57501 | 41.5 |
| 9 | 42.899 | 9.13 | | |
| 10 | −512.719 | 1.80 | 1.49700 | 81.5 |
| 11 | 44.775 | 7.48 | 1.91082 | 35.3 |
| 12 | 146.745 | (Variable) | | |
| 13 | −75.055 | 1.80 | 1.72916 | 54.7 |
| 14 | −13401.153 | (Variable) | | |
| 15 | 190.237 | 5.48 | 1.59282 | 68.6 |
| 16 | −168.072 | 0.30 | | |
| 17 | 90.590 | 4.76 | 1.49700 | 81.5 |
| 18 | 501.290 | 3.49 | | |
| 19 | −112.677 | 2.20 | 1.65160 | 58.5 |
| 20 | 547.372 | 4.41 | | |

NUMERICAL EXAMPLE 5
UNIT: mm
Surface Data

| Surface No. | r | d | nd | vd |
|---|---|---|---|---|
| 21(Diaphragm) | ∞ | 14.16 | | |
| 22 | 90.213 | 7.45 | 1.59522 | 67.7 |
| 23 | −174.714 | 7.47 | | |
| 24 | −357.946 | 2.00 | 1.61340 | 44.3 |
| 25 | 61.677 | 5.34 | | |
| 26 | 195.369 | 1.80 | 1.85478 | 24.8 |
| 27 | 62.924 | 7.38 | 1.59282 | 68.6 |
| 28 | −166.832 | 0.15 | | |
| 29 | 71.433 | 5.02 | 1.87070 | 40.7 |
| 30 | 1004.073 | (Variable) | | |
| 31 | −2872.035 | 3.64 | 1.89286 | 20.4 |
| 32 | −118.966 | 1.50 | 1.67300 | 38.3 |
| 33 | 58.892 | (Variable) | | |
| 34 | 24.066 | 6.51 | 1.53775 | 74.7 |
| 35 | 224.864 | 0.20 | | |
| 36 | 44.663 | 1.20 | 1.80400 | 46.5 |
| 37 | 19.939 | 5.99 | 1.66680 | 33.0 |
| 38 | 186.989 | 1.20 | 1.91082 | 35.3 |
| 39 | 34.880 | 3.18 | | |
| 40 | 549.501 | 1.10 | 2.00100 | 29.1 |
| 41 | 15.135 | 11.47 | 1.72047 | 34.7 |
| 42 | −16.271 | 1.00 | 1.76385 | 48.5 |
| 43 | 33.659 | 1.04 | | |
| 44 | 32.473 | 9.45 | 1.59551 | 39.2 |
| 45 | −20.737 | 1.20 | 1.76385 | 48.5 |
| 46 | −238.845 | 5.96 | | |
| 47 | 67.037 | 9.34 | 1.67300 | 38.3 |
| 48 | −170.544 | 4.92 | | |
| 49 | −209.118 | 2.00 | 2.00100 | 29.1 |
| 50 | 171.944 | 36.41 | | |
| Image Plane | ∞ | | | |

Various Data
ZOOM RATIO 2.84

| | WIDE-ANGLE | MIDDLE | TELEPHOTO |
|---|---|---|---|
| Focal Length: | 144.48 | 252.27 | 411.00 |
| FNO | 4.10 | 4.10 | 4.10 |
| Half Angle of View (degrees) | 8.52 | 4.90 | 3.01 |
| Image Height | 21.64 | 21.64 | 21.64 |
| Overall lens length | 360.00 | 360.00 | 360.00 |
| BF | 36.41 | 36.41 | 36.41 |
| d 5 | 2.50 | 47.55 | 82.95 |
| d12 | 8.29 | 7.57 | 7.00 |
| d14 | 80.94 | 36.61 | 1.78 |
| d30 | 5.35 | 9.01 | 3.00 |
| d33 | 23.06 | 19.40 | 25.41 |

Zoom Lens Unit Data

| Lens Unit | Starting Surface | Focal Length: |
|---|---|---|
| 1 | 1 | 243.25 |
| 2 | 6 | −279.94 |
| 3 | 13 | −103.52 |
| 4 | 15 | 70.73 |
| 5 | 31 | −101.21 |
| EXT | 34 | −122.25 |
| 6 | 47 | 221.00 |

NUMERICAL EXAMPLE 6
UNIT: mm
Surface Data

| Surface No. | r | d | nd | vd |
|---|---|---|---|---|
| 1 | 337.251 | 3.50 | 1.72047 | 34.7 |
| 2 | 158.275 | 13.75 | 1.49700 | 81.5 |
| 3 | −1027.574 | 0.30 | | |
| 4 | 163.884 | 11.30 | 1.43875 | 94.7 |
| 5 | 7458.212 | (Variable) | | |
| 6 | 323.613 | 5.43 | 1.67270 | 32.1 |
| 7 | −255.837 | 6.16 | | |
| 8 | −195.213 | 1.80 | 1.51742 | 52.4 |
| 9 | 57.043 | 7.51 | | |
| 10 | −472.171 | 1.80 | 1.49700 | 81.5 |
| 11 | 60.524 | 6.58 | 1.88300 | 40.8 |
| 12 | 228.247 | 5.21 | | |
| 13 | −97.594 | 1.80 | 1.75500 | 52.3 |
| 14 | −557.632 | (Variable) | | |
| 15 | 150.469 | 5.98 | 1.49700 | 81.5 |
| 16 | −278.413 | 0.30 | | |
| 17 | 93.334 | 5.65 | 1.49700 | 81.5 |
| 18 | 843.516 | 0.30 | | |
| 19 | 63.911 | 5.81 | 1.49700 | 81.5 |
| 20 | 132.786 | 9.28 | | |
| 21 | −168.942 | 2.20 | 1.53172 | 48.8 |
| 22 | 52.656 | (Variable) | | |
| 23(Diaphragm) | ∞ | 0.95 | | |
| 24 | 58.788 | 9.10 | 1.59522 | 67.7 |
| 25 | −154.429 | 0.86 | | |
| 26 | 278.909 | 2.00 | 1.73800 | 32.3 |
| 27 | 48.964 | 5.05 | | |
| 28 | 162.568 | 1.80 | 1.72047 | 34.7 |
| 29 | 76.835 | 5.38 | 1.59282 | 68.6 |
| 30 | −457.240 | 0.15 | | |
| 31 | 64.282 | 4.70 | 1.88300 | 40.8 |
| 32 | 348.254 | (Variable) | | |
| 33 | −448.660 | 3.65 | 2.00069 | 25.5 |
| 34 | −82.017 | 1.50 | 1.76385 | 48.5 |
| 35 | 59.367 | (Variable) | | |
| 36 | 25.121 | 6.63 | 1.59282 | 68.6 |
| 37 | 340.091 | 0.20 | | |
| 38 | 72.638 | 1.20 | 1.72916 | 54.7 |
| 39 | 24.635 | 6.32 | 1.76182 | 26.5 |
| 40 | −223.259 | 1.20 | 2.05090 | 26.9 |
| 41 | 29.346 | 5.98 | | |
| 42 | 131.476 | 1.10 | 2.05090 | 26.9 |
| 43 | 16.890 | 11.78 | 1.72047 | 34.7 |
| 44 | −14.662 | 1.00 | 1.76385 | 48.5 |
| 45 | 69.410 | 1.00 | | |
| 46 | 36.310 | 8.87 | 1.59551 | 39.2 |
| 47 | −21.335 | 1.20 | 1.76385 | 48.5 |
| 48 | 609.160 | 12.00 | | |
| 49 | 61.553 | 7.13 | 1.49700 | 81.5 |
| 50 | 834.029 | 0.30 | | |
| 51 | 64.536 | 2.00 | 1.77250 | 49.6 |
| 52 | 38.148 | 0.70 | | |
| 53 | 39.655 | 11.97 | 1.60342 | 38.0 |
| 54 | −175.599 | 0.20 | | |
| 55 | −198.622 | 2.00 | 1.71736 | 29.5 |
| 56 | 63.810 | 25.00 | | |
| Image Plane | ∞ | | | |

Various Data
ZOOM RATIO 2.84

| | WIDE-ANGLE | MIDDLE | TELEPHOTO |
|---|---|---|---|
| Focal Length: | 144.48 | 269.40 | 411.00 |
| FNO | 4.10 | 4.10 | 4.10 |
| Half Angle of View (degrees) | 8.52 | 4.59 | 3.01 |
| Image Height | 21.64 | 21.64 | 21.64 |
| Overall lens length | 370.00 | 370.00 | 370.00 |
| BF | 25.00 | 25.00 | 25.00 |
| d 5 | 2.00 | 59.04 | 94.00 |
| d14 | 95.20 | 36.92 | 1.20 |
| d22 | 8.15 | 9.39 | 10.15 |

-continued

Various Data
ZOOM RATIO 2.84

|  | WIDE-ANGLE | MIDDLE | TELEPHOTO |
|---|---|---|---|
| d32 | 3.00 | 6.63 | 3.00 |
| d35 | 24.09 | 20.46 | 24.09 |

Zoom Lens Unit Data

| Lens Unit | Starting Surface | Focal Length: |
|---|---|---|
| 1 | 1 | 263.22 |
| 2 | 6 | −84.75 |
| 3 | 15 | 246.73 |
| 4 | 23 | 62.39 |
| 5 | 33 | −81.68 |
| EXT | 36 | −118.58 |
| 7 | 49 | 199.72 |

TABLE 1 below summarizes various values of numerical examples.

|  | Example | | |
|---|---|---|---|
|  | 1.4 | 2.5 | 3.6 |
| (1) −0.70 < fn − 1/fn < −0.10 | −0.322 | −0.458 | −0.409 |
| (2) 0.30 < Lnm/Lsi < 0.70 | 0.387 | 0.369 | 0.464 |
| (3) 0.70 < f1/ft < 1.10 | 0.919 | 0.830 | 0.898 |
| (4) 0.88 < Lnw/Lnt < 1.10 | 0.994 | 0.969 | 1.000 |
| (5) −0.60 < fnl/fn < −0.15 | −0.250 | −0.425 | −0.336 |
| (6) −1.00 < fnp/fnl < −0.60 | −0.867 | −0.773 | −0.816 |

Image Pickup Apparatus

Figure 13:
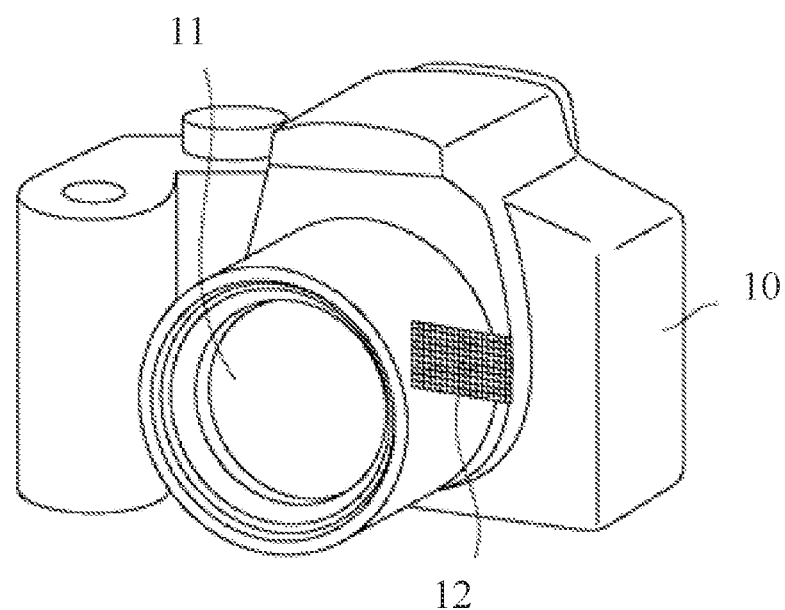
FIG. 13 is a schematic view of an image pickup apparatus.

Referring now to FIG. 13, a description will be given of an example of a digital still camera (image pickup apparatus) using the zoom lens according to each example as an imaging optical system. In FIG. 13, reference numeral 10 denotes a camera body, and reference numeral 11 denotes the imaging optical system that includes any one of the zoom lenses according to Examples 1 to 6. Reference numeral 12 denotes a solid-state image sensor (photoelectric conversion element), such as a CCD sensor or a CMOS sensor, which is built in the camera body 10, receives an optical image formed by the imaging optical system 11, and performs a photoelectric conversion. The camera body 10 may be a so-called single-lens reflex camera having a quick turn mirror, or a so-called mirrorless (non-reflex) camera having no quick turn mirror.

The zoom lens according to each example applied to an image pickup apparatus such as a digital still camera in this way can provide the image pickup apparatus having a small lens.

Each of the above examples can provide a zoom lens having a large aperture diameter and a long focal length, which can easily change a focal length range to a long focal length side by inserting an extender into a main optical system and can maintain good optical performance before and after the extender is inserted.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-122560, filed on Jul. 27, 2021, which is hereby incorporated by reference herein in its entirety.

What is claimed is:

1. A zoom lens comprising, in order from an object side to an image side, a first lens unit having a positive refractive power, a second lens unit having a negative refractive power, and a rear group including a plurality of lens units, wherein a lens unit is a group of lenses that is moved or stands still integrally during zooming, wherein each distance between adjacent lens units is changed during zooming, wherein the first lens unit consists of three lenses, wherein the second lens unit consists of four or five lenses, wherein the rear group includes an aperture stop, an n-th lens unit disposed closest to an image plane and having a positive refractive power, and an (n−1)-th lens unit disposed adjacent to the n-th lens unit on the object side and having a negative refractive power, and wherein the following inequalities are satisfied:

$-0.7 < fn{-}1/fn < -0.1$ $0.3 < Lnm/Lsi < 0.7$ where fn−1 is a focal length of the (n−1)-th lens unit, fn is a focal length of the n-th lens unit, Lnm is a first distance on an optical axis from the most image plane side lens surface of the (n−1)-th lens unit to the most object side lens surface of the n-th lens unit at a zoom position that minimizes the first distance in an entire zoom range, and Lsi is a distance on the optical axis from the aperture stop to the image plane at the zoom position.

2. The zoom lens according to claim 1, wherein the following inequality is satisfied:

$0.7 < f1/ft < 1.1$ where f1 is a focal length of the first lens unit, and ft is a focal length of the zoom lens at a telephoto end.

3. The zoom lens according to claim 1, wherein the (n−1)-th lens unit is moved in a convex trajectory toward the image side during zooming from a wide-angle end to a telephoto end.

4. The zoom lens according to claim 1, wherein the following inequality is satisfied:

$0.88 < Lnw/Lnt < 1.10$ where Lnw is a distance on the optical axis from the lens surface closest to the image plane of the (n−1)-th lens unit to the lens surface closest to the object of the n-th lens unit at a wide-angle end, and Lnt is a distance on the optical axis from the lens surface of the (n−1)-th lens unit closest to the image plane to the lens surface closest to the object of the n-th lens unit at a telephoto end.

5. The zoom lens according to claim 1, wherein the (n−1)-th lens unit is moved during focusing.

6. The zoom lens according to claim 5, wherein the (n−1)-th lens unit includes a cemented lens consisting of a positive lens and a negative lens.

7. The zoom lens according to claim 1, wherein the following inequality is satisfied:

$-0.60 < fnl/fn < -0.15$ where fn1 is a focal length of a lens disposed closest to the image plane of the n-th lens unit.

8. The zoom lens according to claim 1, wherein the following inequality is satisfied:

$-1.0 < fnp/fnl < -0.6$ where fnp is a focal length of a lens having the largest positive refractive power in the n-th lens unit.

9. The zoom lens according to claim 1, further comprising an extender configured to convert a magnification of the zoom lens and disposed in a space between the (n−1)-th lens unit and the n-th lens unit,
wherein in a case where the extender is inserted into an optical path, a focal length range of the zoom lens is changed to a long focal length side without changing an overall lens length.

10. The zoom lens according to claim 1, wherein the rear group comprises, in order from the object side to the image side, the aperture stop, a third lens unit having a positive refractive power, a fourth lens unit having a negative refractive power as the (n−1)-th lens unit, and a fifth lens unit having a positive refractive power as the n-th lens unit.

11. The zoom lens according to claim 1, wherein the rear group comprises, in order from the object side to the image side, the aperture stop, a third lens unit having a negative refractive power, a fourth lens unit having a positive refractive power, a fifth lens unit having a negative refractive power as the (n−1)-th lens unit, and a sixth lens unit having a positive refractive power as the n-th lens unit.

12. The zoom lens according to claim 1, wherein the rear group comprises, in order from the object side to the image side, the aperture stop, a third lens unit having a positive refractive power, a fourth lens unit having a positive refractive power, and a fifth lens unit having a negative refractive power as the (n−1)-th lens unit, and a sixth lens unit having a positive refractive power as the n-th lens unit.

13. The zoom lens according to claim 1, wherein the first lens unit consists of, in order from the object side to the image side, a cemented lens consisting of a negative lens and a positive lens, and a positive lens.

14. The zoom lens according to claim 1, wherein the first lens unit consists of, in order from the object side to the image side, a positive lens and a cemented lens consisting of a negative lens and a positive lens.

15. The zoom lens according to claim 1, wherein the n-th lens unit consists of, in order from the object side to the image side, a positive lens and a negative lens.

16. The zoom lens according to claim 1, wherein the n-th lens unit consists of, in order from the object side to the image side, a positive lens, a negative lens, a positive lens, and a negative lens.

17. An extender attachable to and detachable from a zoom lens and configured to convert a magnification of the zoom lens,
wherein the extender comprises, in order from an object side to an image side, a positive lens, a first cemented lens having a negative refractive power and consisting of a negative lens, a positive lens, and a negative lens, and a second cemented lens having a negative refractive power and consisting of a negative lens, a positive lens, and a negative lens, and a third cemented lens having a positive refractive power and consisting of a positive lens and a negative lens,
wherein the zoom lens comprises, in order from the object side to the image side, a first lens unit having a positive refractive power, a second lens unit having a negative refractive power, and a rear group including a plurality of lens units, wherein a lens unit is a group of lenses that is moved or stands still integrally during zooming,
wherein each distance between adjacent lens units is changed during zooming,
wherein the first lens unit consists of three lenses,
wherein the second lens unit consists of four or five lenses,
wherein the rear group includes an aperture stop, an n-th lens unit disposed closest to an image plane and having a positive refractive power, and an (n−1)-th lens disposed on the object side of the n-th lens unit and having a negative refractive power, and
wherein the following inequalities are satisfied:

$-0.7 < fn-1/fn < -0.1$ $0.3 < Lnm/Lsi < 0.7$ where fn−1 is a focal length of the (n−1)-th lens unit, fn is a focal length of the n-th lens unit, Lnm is a first distance on an optical axis from the most image plane side lens surface of the (n−1)-th lens unit to the most object side lens surface of the n-th lens unit at a zoom position that minimizes the first distance in an entire zoom range, and Lsi is a distance on the optical axis from the aperture stop to the image plane at the zoom position.

18. An image pickup apparatus comprising:
a zoom lens; and
an image sensor configured to receive an image formed by the zoom lens,
wherein the zoom lens comprises, in order from an object side to an image side, a first lens unit having a positive refractive power, a second lens unit having a negative refractive power, and a rear group including a plurality of lens units, wherein a lens unit is a group of lenses that is moved or stands still integrally during zooming,
wherein each distance between adjacent lens units is changed during zooming,
wherein the first lens unit consists of three lenses,
wherein the second lens unit consists of four or five lenses,
wherein the rear group includes a aperture stop, an n-th lens unit disposed closest to an image plane and having a positive refractive power, and an (n−1)-th lens disposed on the object side of the n-th lens unit and having a negative refractive power, and
wherein the following inequalities are satisfied:

$-0.7 < fn-1/fn < -0.1$ $0.3 < Lnm/Lsi < 0.7$ where fn−1 is a focal length of the (n−1)-th lens unit, fn is a focal length of the n-th lens unit, Lnm is a first distance on an optical axis from the most image plane side lens surface of the (n−1)-th lens unit to the most object side lens surface of the n-th lens unit at a zoom position that minimizes the first distance in an entire zoom range, and Lsi is a distance on the optical axis from the aperture stop to the image plane at the zoom position.

* * * * *